(12) United States Patent
Richmond et al.

(10) Patent No.: US 8,955,859 B1
(45) Date of Patent: Feb. 17, 2015

(54) ISOLATED CAB MOUNTING SYSTEM FOR AN ARMORED VEHICLE

(71) Applicant: Oshkosh Corporation

(72) Inventors: Micah C. Richmond, Omro, WI (US); Kristopher J. Krueger, Neenah, WI (US); David J Pelko, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 157 days.

(21) Appl. No.: 13/628,882

(22) Filed: Sep. 27, 2012

Related U.S. Application Data

(60) Provisional application No. 61/539,838, filed on Sep. 27, 2011.

(51) Int. Cl.
 *F41H 7/02* (2006.01)
 *B62D 21/11* (2006.01)
 *F41H 7/04* (2006.01)

(52) U.S. Cl.
 CPC ...................................... *F41H 7/044* (2013.01)
 USPC .............. 280/124.109; 280/785; 296/187.08; 296/190.08; 296/193.01; 89/930

(58) Field of Classification Search
 USPC .............. 280/124.109, 785; 180/89.1, 89.18; 296/187.01, 193.01, 29, 187.08, 296/190.08; 89/36.08, 930
 See application file for complete search history.

(56) References Cited

U.S. PATENT DOCUMENTS

| | | | |
|---|---|---|---|
| 3,881,767 A * | 5/1975 | Klees ........................... | 296/35.2 |
| 4,326,445 A | 4/1982 | Bemiss | |
| 5,438,908 A * | 8/1995 | Madden, Jr. ................. | 89/36.08 |
| 5,487,323 A * | 1/1996 | Madden, Jr. ................. | 89/36.08 |
| 5,533,781 A | 7/1996 | Williams | |
| 5,663,520 A | 9/1997 | Ladika et al. | |
| 5,670,734 A * | 9/1997 | Middione et al. ............ | 89/36.08 |
| 5,679,918 A * | 10/1997 | Korpi et al. .................. | 89/36.08 |
| 5,915,775 A * | 6/1999 | Martin et al. ................ | 296/35.2 |
| 6,394,007 B2 | 5/2002 | Lewis et al. | |
| 6,658,984 B2 | 12/2003 | Zonak | |
| 6,820,908 B1 * | 11/2004 | Tousi et al. .................. | 296/35.1 |
| 7,114,764 B1 | 10/2006 | Barsoum et al. | |
| 7,281,600 B2 * | 10/2007 | Chernoff et al. ............. | 180/291 |
| 7,406,909 B2 | 8/2008 | Shah et al. | |
| 7,441,809 B1 * | 10/2008 | Coombs et al. ............... | 280/785 |
| 7,695,053 B1 | 4/2010 | Boczek et al. | |
| 7,770,506 B2 | 8/2010 | Johnson et al. | |
| 7,789,010 B2 * | 9/2010 | Allor et al. ................... | 89/36.03 |
| 7,905,534 B2 | 3/2011 | Boczek et al. | |
| 7,905,540 B2 | 3/2011 | Kiley et al. | |
| 7,908,959 B2 | 3/2011 | Pavon | |
| 7,934,766 B2 | 5/2011 | Boczek et al. | |
| 7,938,478 B2 * | 5/2011 | Kamimae ................ | 296/190.08 |
| 8,096,225 B1 | 1/2012 | Johnson et al. | |

(Continued)

*Primary Examiner* — Drew Brown

(74) *Attorney, Agent, or Firm* — Foley & Lardner LLP

(57) ABSTRACT

A blast resistant vehicle is disclosed that includes a structural frame member, a first frame coupled to the structural frame member and configured to receive a first axle assembly and a first suspension assembly, a second frame coupled to the structural frame member and configured to receive a second axle assembly and a second suspension assembly, and a cab assembly having a front portion and a rear portion and having a floor panel, a front firewall, a rear body panel, a first side panel, and a second side panel. The cab assembly is isolated from the structural frame member, the front sub-frame, and the rear sub-frame.

14 Claims, 19 Drawing Sheets

(56) References Cited

U.S. PATENT DOCUMENTS

| | | |
|---|---|---|
| 8,413,568 B2 | 4/2013 | Kosheleff |
| 8,596,183 B2 | 12/2013 | Coltrane |
| 8,601,931 B2 * | 12/2013 | Naroditsky et al. ......... 89/36.08 |
| 8,746,741 B2 * | 6/2014 | Gonzalez ..................... 280/784 |
| 2002/0153183 A1 * | 10/2002 | Puterbaugh et al. ....... 180/89.13 |
| 2004/0149500 A1 * | 8/2004 | Chernoff et al. ............. 180/65.1 |
| 2005/0132873 A1 | 6/2005 | Diaz Supisiche et al. |
| 2008/0053739 A1 * | 3/2008 | Chernoff et al. ............. 180/400 |
| 2010/0218667 A1 | 9/2010 | Naroditsky et al. |
| 2010/0307329 A1 * | 12/2010 | Kaswen et al. ............. 89/36.08 |
| 2010/0319525 A1 | 12/2010 | Pavon |
| 2011/0314999 A1 * | 12/2011 | Luther et al. ................ 89/36.02 |
| 2012/0049570 A1 | 3/2012 | Aizik |
| 2012/0097019 A1 | 4/2012 | Sherbeck et al. |
| 2012/0111180 A1 | 5/2012 | Johnson et al. |
| 2012/0174767 A1 | 7/2012 | Naroditsky et al. |
| 2013/0009423 A1 * | 1/2013 | Yamamoto et al. ...... 296/190.08 |
| 2013/0205984 A1 * | 8/2013 | Henker et al. ............... 89/36.08 |
| 2013/0241237 A1 | 9/2013 | Dziuba et al. |
| 2013/0263729 A1 | 10/2013 | Johnson et al. |
| 2013/0312595 A1 | 11/2013 | Lee |
| 2014/0060304 A1 * | 3/2014 | Harmon et al. ............. 89/36.02 |

* cited by examiner

US 8,955,859 B1

ISOLATED CAB MOUNTING SYSTEM FOR AN ARMORED VEHICLE

CROSS-REFERENCE TO RELATED PATENT APPLICATIONS

This application claims the benefit of U.S. Provisional Patent Application No. 61/539,838, filed Sep. 27, 2011, which is incorporated herein by reference in its entirety.

BACKGROUND

The present application relates generally to the field of armored vehicles. More specifically, the present application relates to features for an armored vehicle to manage high bursts of energy, such as the energy produced by a landmine explosion or an improvised explosion device (IED) during a blast event (i.e., as the landmine or IED explodes).

An armored vehicle may include a number of vehicle systems or components, such as a cab or body, a chassis or frame, a suspension system, a drive train, and other systems or components. Proper functioning of any or all of the vehicle systems or components is important for the proper functioning of the vehicle. Protecting the occupants of the vehicle during an attack or blast event is also important.

Thus, a need exists for a vehicle having armor and other features for protecting the various vehicle systems and/or occupants of the vehicle.

SUMMARY

One embodiment of the application relates to a blast-resistant vehicle. The blast resistant vehicle includes a structural frame member, a front sub-frame coupled to the structural frame member and configured to receive a first axle assembly and a first suspension assembly and a rear sub-frame coupled to the structural frame member and configured to receive a second axle assembly and a second suspension assembly. The blast resistant vehicle also includes a cab assembly having a front portion and a rear portion and including a floor panel, a front firewall, a rear body panel, a first side panel, and a second side panel. The cab assembly is isolated from the structural frame member, the front sub-frame, and the rear sub-frame.

Another embodiment of the application relates to a military vehicle. The military vehicle includes a blast absorbing assembly having a front sub-frame assembly that includes a front suspension and a front axle and a rear sub-frame assembly that includes a rear suspension and a rear axle. The blast absorbing assembly also includes a structural frame member coupled to the front sub-frame and the rear sub-frame, an armor assembly coupled to the frame member, and a prime mover coupled to at least one of the front sub-frame and the rear sub-frame. The military vehicle also includes an isolated cab assembly having an outer surface. The spacing between the outer surface of the isolated cab assembly and the blast absorbing assembly defines a blast gap.

Yet another embodiment of the application relates to a method for protecting occupants within a military vehicle. The method includes providing a structural frame member, providing a front sub-frame, and providing a rear sub-frame. The method also includes coupling the front sub-frame to a front portion of the structural frame member and the rear sub-frame to a rear portion of the structural frame member. The method finally includes providing a cab assembly configured to provide seating for occupants and isolating the cab assembly from each of the front sub-frame, the rear sub-frame, and the structural frame member.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
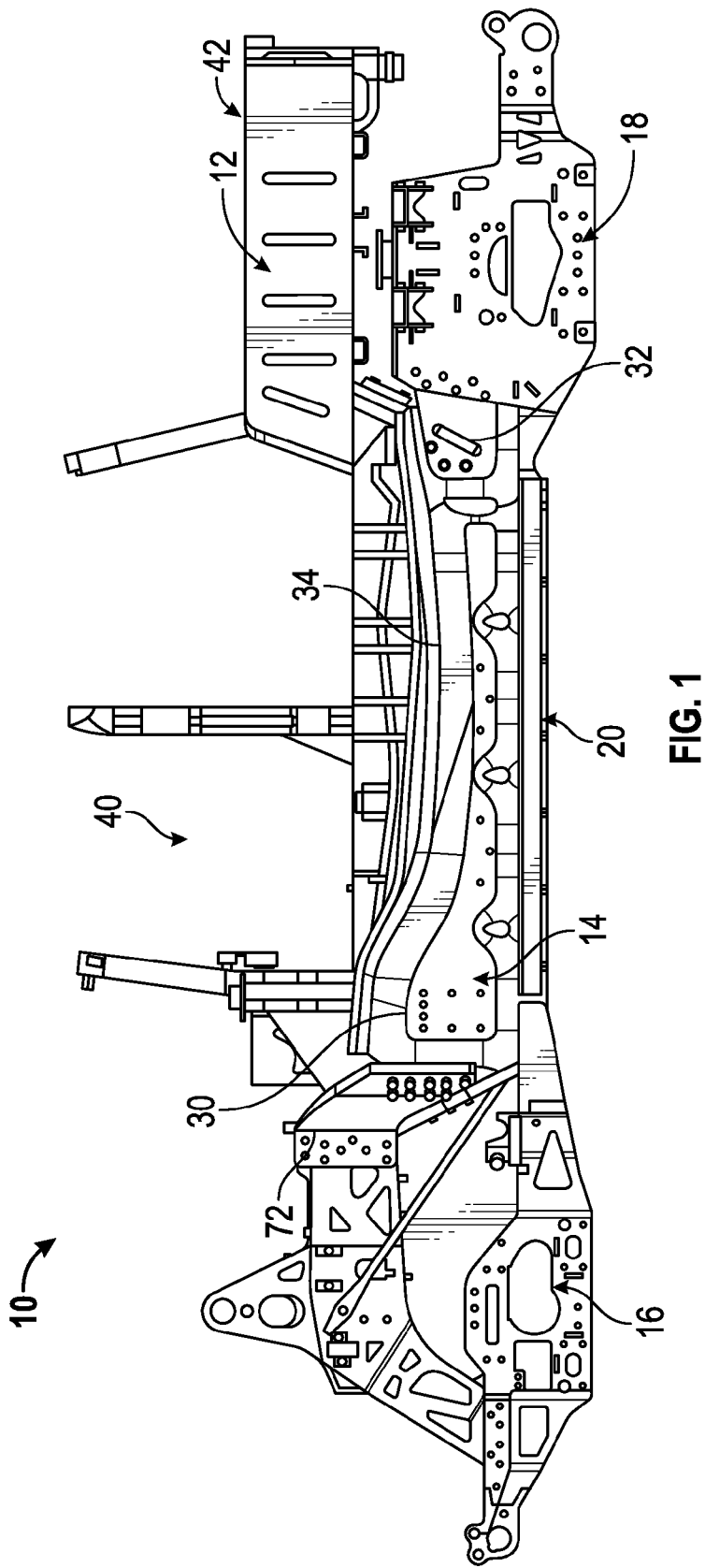
FIG. 1 is a partial side view of a vehicle, according to an exemplary embodiment.

According to the exemplary embodiment shown in FIG. 1, an armored vehicle, shown as vehicle 10 includes a body (e.g., cabin, housing, etc.), shown as cab 12 and a structural armor component (e.g., chute, plate, tubular member, angled structural member, etc.), shown as tunnel 14. According to an exemplary embodiment, the cab 12 may be coupled to the tunnel 14. Cab 12 may be coupled to the tunnel 14 using isolators that provide shock absorption and isolation of the cab 12 from vibrations (e.g., from road hazards, bomb blasts, etc.). According to an exemplary embodiment, the cab 12 includes an occupant area, shown as passenger compartment 40 and a cargo area, shown as bed 42.

As shown in FIG. 1, according to an exemplary embodiment, the vehicle 10 includes a front sub-frame 16 and a rear sub-frame 18. Front sub-frame 16 and rear sub-frame 18 may be configured to support an axle and suspension system. By way of example, the front sub-frame 16 may support a front axle and a front suspension system, while the rear sub-frame 18 may support a rear axle and a rear suspension system. Although not shown, the vehicle 10 may also include a power source or prime mover (e.g., diesel engine, gasoline engine, electric motor, etc.) powering a drive train (e.g., driveline). The drive train may include a transmission, a driveshaft, axles, and other components.

According to an exemplary embodiment, the vehicle 10 is designed to survive a blast from an IED or a landmine by allowing explosive energy of the blast to pass around components of the vehicle 10. The vehicle 10 may also include components designed to absorb, deflect, or dissipate the blast from an IED or a landmine. In some embodiments, the vehicle may be a military vehicle such as a high mobility multi-purpose wheeled vehicle (HMMWV), a mine resistant ambush protected (MRAP) vehicle, a heavy expanded mobility tactical truck (HEMTT), or another military vehicle. In other contemplated embodiments, the vehicle may be one of a broad range of vehicles (e.g., semi truck, construction equipment, troop transport, aircraft, amphibious vehicle, etc.), having a structure designed to mitigate harm caused by an explosive blast directed toward the undercarriage (e.g., frame, body, hull, suspension, drive train, etc.) of the vehicle.

According to an exemplary embodiment, the tunnel 14 acts as a structural member for the vehicle 10. Such a tunnel 14 may also provide protection from blasts and explosive devices. As shown in FIG. 1, the tunnel 14 couples the front sub-frame 16 to the rear sub-frame 18. Such a tunnel 14 acts as a main frame or chassis component for the vehicle 10 and eliminates the need for vehicle 10 to include a separate frame member to couple front sub-frame 16 and rear sub-frame 18. Removing a separate frame component reduces the cost and weight of vehicle 10.

According to an alternative embodiment, tunnel 14 may be integrated into a traditional or existing frame system of a vehicle. Such integration may occur by positioning tunnel 14 (e.g., from below, down from above, etc.) such that a mounting interface of the tunnel may be coupled with a surface of the frame rail. By way of example, traditional frame rails are elongated rectangular tubular structures extending longitudinally along the length of a vehicle. A mounting surface on the frame rail may include the vertical sidewalls or a horizontal surface of the traditional frame rail. Such a configuration may not reduce the weight of the vehicle frame assembly but may reinforce the structural integrity of the vehicle or provide additional blast protection.

Figure 2:
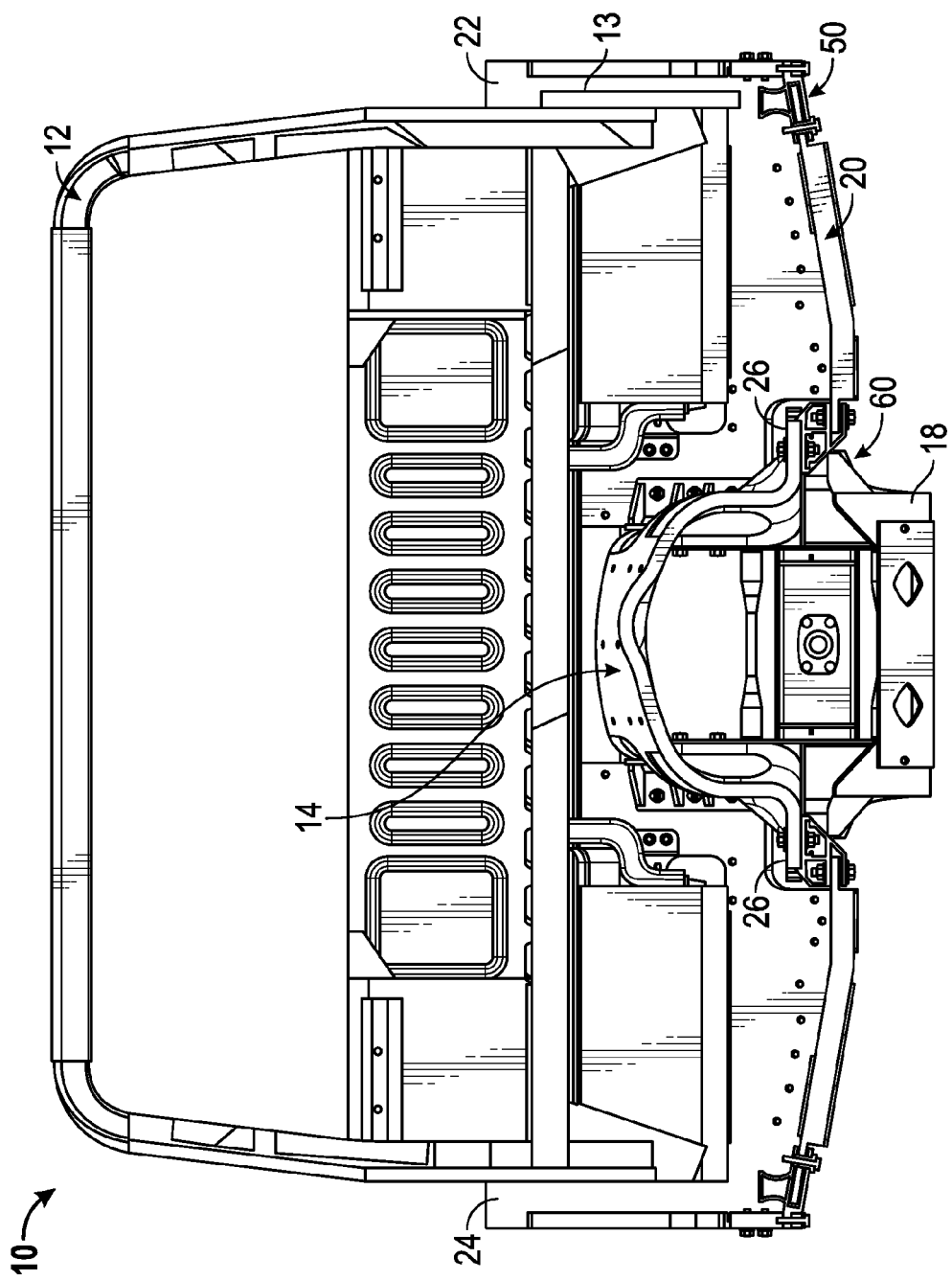
FIG. 2 is a partial front cross-sectional view of the vehicle of FIG. 1, according to an exemplary embodiment.
Figure 3:
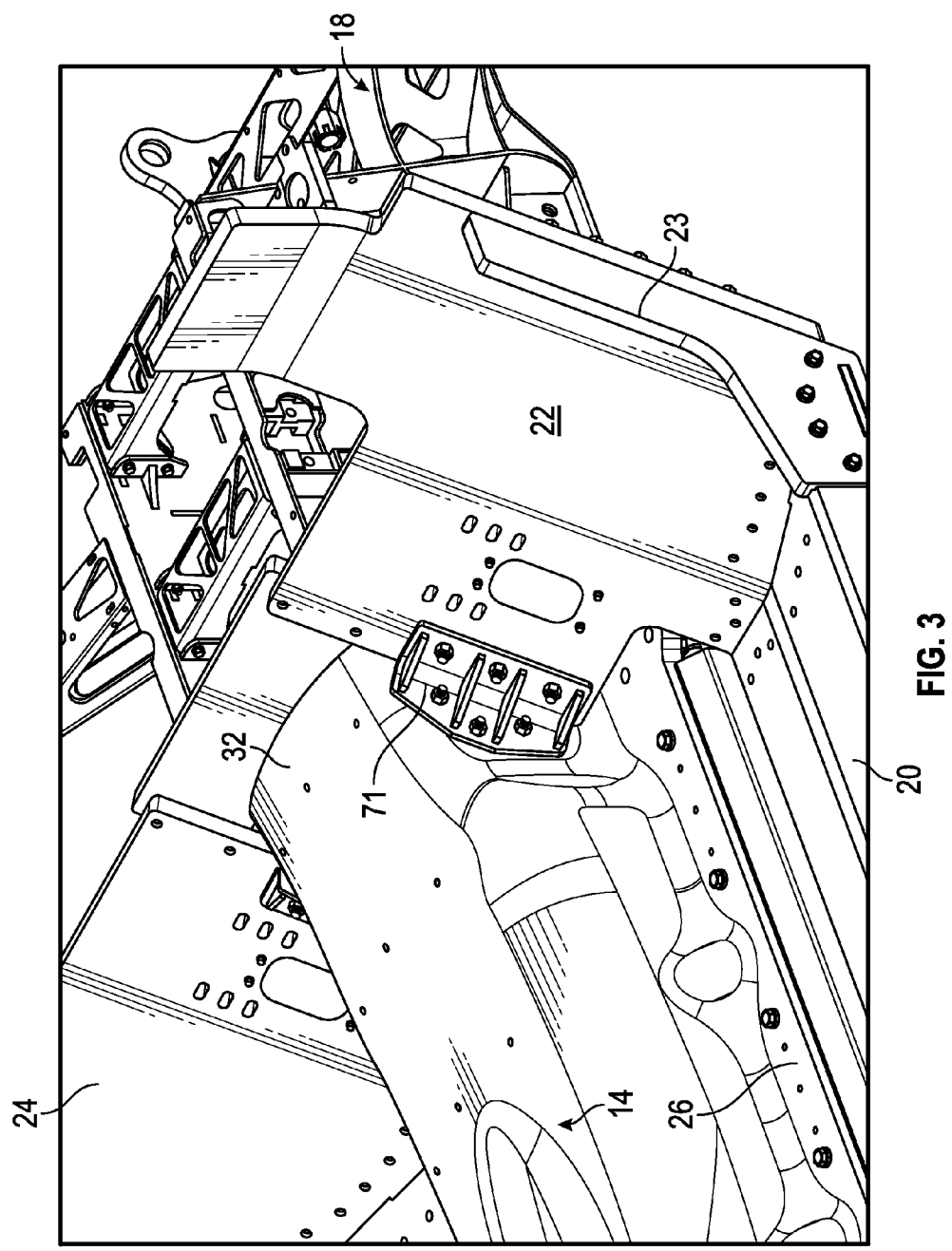
FIG. 3 is a partial perspective view of various armor components for the vehicle of FIG. 1, according to an exemplary embodiment.

As shown in FIGS. 1-3, the tunnel 14 has a shape designed to provide structural support and blast protection to vehicle 10. According to an exemplary embodiment, tunnel 14 has a generally semitubular (e.g., a longitudinally-split half of a tube, and upside down "U", etc.) shape and includes an intermediate portion, shown as middle portion 34 extending between a front portion 30 and a rear portion 32. As shown in FIGS. 1-3, tunnel 14 includes an enclosing portion (e.g., the curved upper portion) that extends laterally across the width of tunnel 14 to form a cavity. According to an alternative embodiment, the enclosing portion may also include various additional features (e.g., sidewalls, protrusions, flanges, etc.). A tunnel 14 having a semitubular shape has improved torsional stiffness relative to traditional frame rail designs. As shown in FIG. 1, front portion 30 of the tunnel 14 is positioned within vehicle 10 adjacent to or under a front section of the passenger compartment 40, and rear portion 32 is positioned within vehicle 10 adjacent to or under a rear section of the passenger compartment 40.

According to the exemplary embodiment shown in FIG. 1, the tunnel 14 extends the entire length of the passenger compartment 40 of the vehicle 10. Such a tunnel 14 provides blast protection to both a front and a rear portion of passenger compartment 40. As shown in FIGS. 1-2, the front portion 30 of tunnel 14 includes an opening having a larger cross-sectional area than the cross-sectional area of middle portion 34. Similarly, the rear portion 32 of the tunnel 14 includes an opening having a larger cross-sectional area than the cross-sectional area of middle portion 34. A tunnel 14 having larger openings may more efficiently dissipate and vent a blast impulse away from the passenger compartment 40 because the bomb blast may be directed towards the front and rear of the vehicle 10 out through the larger openings of the front portion 30 and rear portion 32. Such venting is intended to direct blast energy away from occupants and towards the various components of vehicle 10.

Although the tunnel 14 is shown as having a generally semitubular configuration, the tunnel 14 may include other components (e.g., mounting brackets, depressions, apertures, etc.) coupled to the semitubular portion. According to an alternative embodiment, tunnel 14 may have another shape, size, or configuration. By way of example, the tunnel 14 may have a "V" shape, an upside down "V" shape, or another configuration designed to deflect, absorb, or deflect blasts from the passenger compartment 40 of the vehicle 10.

According to an exemplary embodiment, the tunnel 14 includes a shape (e.g., a semitubular shape, etc.) that decreases the area of the tunnel 14 that is generally perpendicular to a blast and maximizes the area of the tunnel that is angled with respect to a blast. Such a shape is intended to reduce the amount of blast energy transferred into the vehicle 10 by increasing the standoff to the top of the tunnel 14 as well as decreasing the dynamic deflection of the underbody upwards towards the crew compartment 40. In addition to reducing dynamic deflection, the longitudinal stiffness of the tunnel 14 also couples the chassis and powertrain mass directly to the underbody armor. Such coupling causes the mass of the chassis to be engaged earlier in the blast event thereby reducing the energy input to the crew compartment. Unlike a standard underbody configuration having a "V" shape, these benefits are magnified where the blast occurs at a location offset from the centerline of vehicle 10.

According to an exemplary embodiment, the tunnel 14 is constructed using any suitable method (e.g., forging, stamping, molding, forming, etc.). By way of example, the tunnel 14 may be forged or cast as a single or unitary component (e.g., to save weight and cost). Such a forging or casting operation that allows for a unitary construction may improve the structural integrity of the tunnel 14 and the vehicle 10 by eliminating the need to fasten multiple components with joints. According to an alternative embodiment, the tunnel 14 may be constructed from other known methods or made from multiple pieces that are later assembled or coupled together. According to an exemplary embodiment, the tunnel 14 is constructed from a suitable material (e.g., a material selected to perform well in a blast and/or fragmentation event). By way of example, the tunnel 14 may be constructed from aluminum or an aluminum alloy, steel, another metal, or a composite material (e.g., fiberglass, Kevlar, a multi-layered composite, carbon fiber, etc.).

According to the exemplary embodiment shown in FIGS. 1-3, tunnel 14 extends upwards from a mounting portion, shown as flange 26. Such a configuration may improve the ground clearance of vehicle 10. Further, a tunnel 14 extending upwards from a mounting portion may reduce the energy absorbed by vehicle 10 from an IED blast. The underside of vehicle 10 is exposed to a blast wave and debris during a blast event. By way of example, such debris may include portions of the IED, shrapnel, or other objects located on a road surface. The initial explosion of an IED transfers energy to the surrounding air in the form of a blast wave and also transfers energy into debris. Such a blast wave and debris may travel towards vehicle 10 at an initial velocity and lose energy as they travel through the air. Therefore, a vehicle 10 having a tunnel 14 extending upwards from flanges 26 (i.e. having a greater ground clearance) may receive less energy from an IED blast because the blast wave and debris must travel a longer distance before impacting tunnel 14 or the other components of vehicle 10.

According to an exemplary embodiment, the tunnel 14 is an integral structural frame member. Such a tunnel 14 may structurally support cab 12, an armored underbody, a suspension assembly, and a drive train, among other components of vehicle 10. Supporting a vehicle body, such as cab 12, with tunnel 14 reduces the need for cab 12 to serve as a structural component, thereby reducing the weight and complexity of the body design. As shown in FIG. 1, front sub-frame 16 and rear sub-frame 18 are coupled directly to the tunnel 14. Such a tunnel 14 provides a direct load transfer from the suspension components coupled to each sub-frame to the tunnel 14 having an improved torsional and longitudinal stiffness. A vehicle may also include various drive train components (e.g., a transmission, drive axles, etc.) disposed within tunnel 14. Locating drive train components within tunnel 14 may improve the serviceability of a vehicle by allowing efficient access to these components without the need to remove armor panels.

As shown in FIGS. 2-3, the tunnel 14 also supports other armor components. By way of example, armor members (e.g., wings, panels, plates, etc.) shown as underbody armor components 20 are coupled to the tunnel 14. As shown in FIGS. 2-3, underbody armor components 20 are coupled to a first and a second side of tunnel 14 through flanges 26. According to an exemplary embodiment, each flange 26 extends the entire length of the tunnel 14. As shown in FIG. 2, each flange 26 extends outward from the tunnel 14 in a generally horizontal direction (e.g., at an angle of less than 10 degrees relative to a horizontal axis). According to various alternative embodiments, the flange 26 of the tunnel 14 may extend in another direction, or tunnel 14 may not include a flange 26. By way of example, the flange 26 may extend outward from the tunnel 14 in a generally downward direction, at a downward angle, in a generally upward direction, or at an upward angle.

As shown in FIG. 2, a first underbody armor component 20 is located under the driver's side of the passenger compartment 40, and a second underbody armor component 20 is located under the passenger's side of the passenger compartment 40. According to an exemplary embodiment, each underbody armor component 20 angles upward from the tunnel 14 to an outside edge of the vehicle 10. According to various alternative embodiments, each underbody armor component may extend in other directions (e.g., lateral, horizontal, etc.). Such a configuration of underbody armor components 20 may facilitate the deflection or dissipation of blast energy outward and away from the vehicle 10.

Referring next to the exemplary embodiment shown in FIG. 3, vehicle 10 includes a first armor member, shown as first rear armor component 22 and a second armor member, shown as second rear armor component 24. As shown in FIG. 3, first rear armor component 22 and second rear armor component 24 are coupled to the tunnel 14 with supports, shown as brackets 71. The first rear armor component 22 and second rear armor component 24 are also coupled along an edge to the underbody armor components 20 with a support, shown as bracket 23. According to an exemplary embodiment, first rear armor component 22 and second rear armor component 24 are configured to provide protection to the rear of the passenger compartment 40. Such protection may be particularly important upon the explosion of an IED adjacent a rear wheel or the rear of the vehicle 10.

Figure 4:
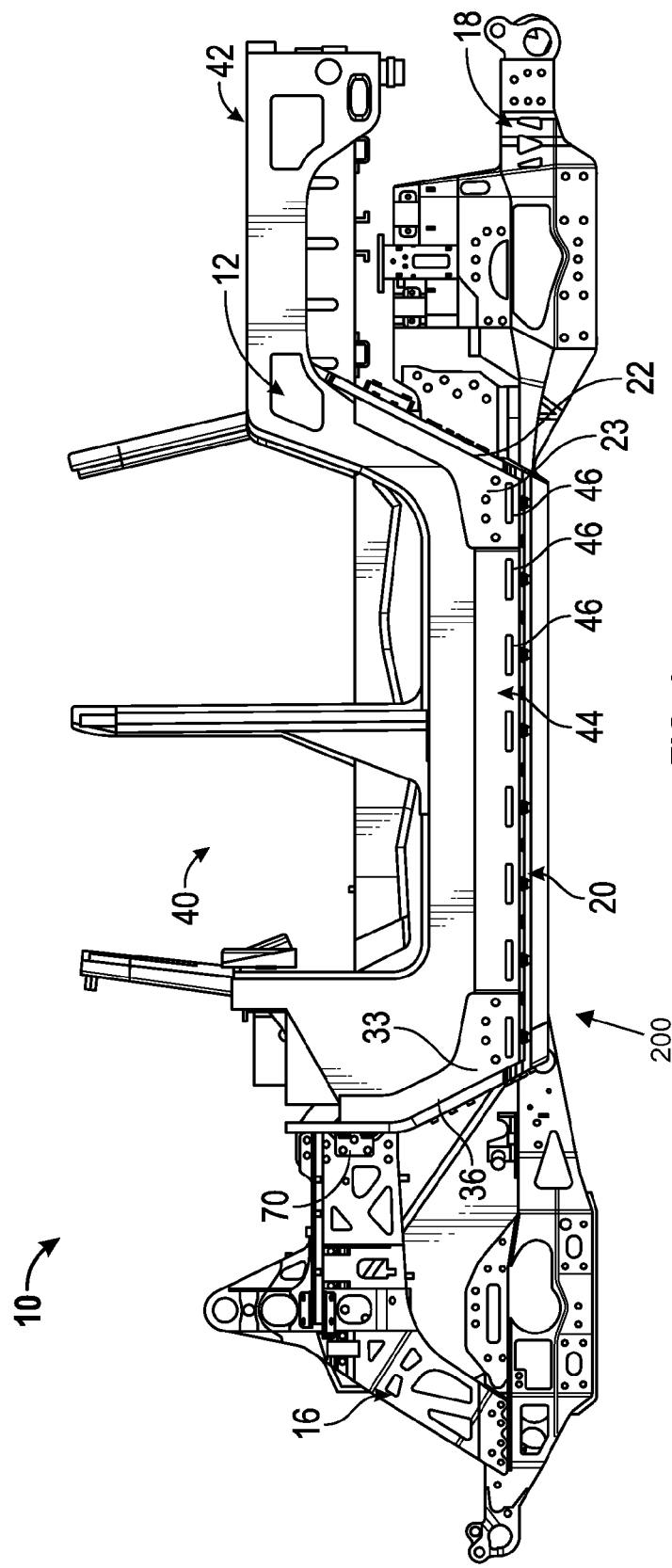
FIG. 4 is a partial side view of the vehicle of FIG. 1, according to an exemplary embodiment.

Referring next to the exemplary embodiment shown in FIG. 4, vehicle 10 includes a third armor member, shown as first front armor component 36 and a second front armor component 38 (not shown). As shown in FIG. 3, first front armor component 36 is coupled along an edge to the underbody armor components 20 with a support, shown as bracket 33. Second front armor component 38 may be coupled to underbody armor components 20 in a similar way. According to an exemplary embodiment, first front armor component 36 and second front armor component 38 are configured to provide protection to the front of the passenger compartment 40. Such protection may be particularly important upon the explosion of an IED adjacent a front wheel or the front of the vehicle 10.

According to the exemplary embodiment shown in FIG. 4, vehicle 10 includes an armor plate positioned along the length of the vehicle, shown as sidewall armor component 44. According to an exemplary embodiment, vehicle 10 includes a first sidewall armor component 44 positioned along the driver's side of vehicle 10 and a second sidewall armor component 44 positioned along the passenger's side of vehicle 10. As shown in FIG. 4, sidewall armor component 44 is coupled to an outer edge of the underbody armor components 20, bracket 23, and bracket 33.

Figures 6, 7:
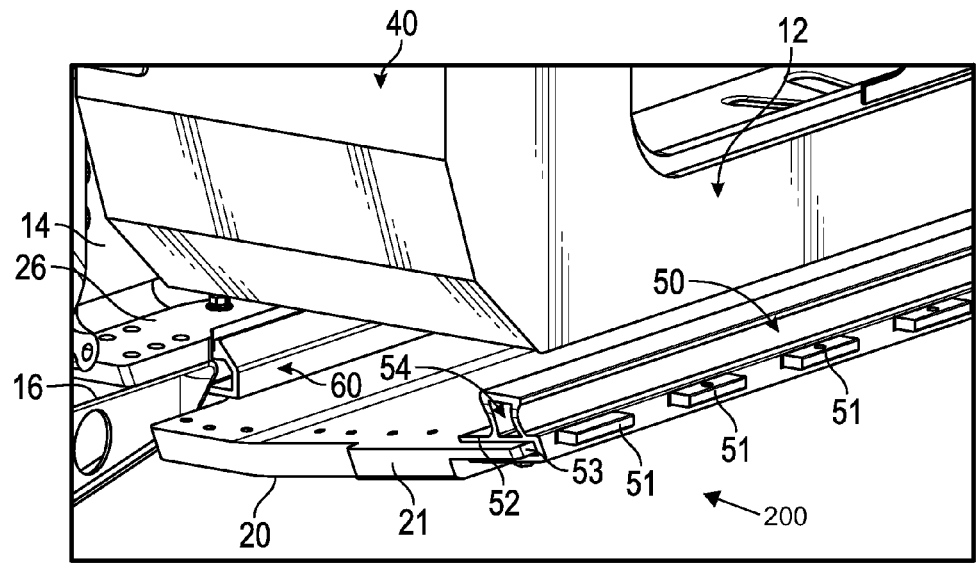
FIG. 6 is a partial perspective view of various armor components for the vehicle of FIG. 1, according to an exemplary embodiment.
FIG. 7 is a partial cross-sectional view of a crushable member for the vehicle of FIG. 1, according to an exemplary embodiment.

According to the exemplary embodiment shown in FIGS. 4 and 6, sidewall armor component 44 is coupled to the underbody armor components 20, bracket 23, and bracket 33 with a plurality of interlocking joints, shown as toothed connections 46. As shown in FIG. 6, each toothed connection 46 may be formed by mating portions of underbody armor components 20 and bracket 23, bracket 33, or sidewall armor component 44. By way of example, the underbody armor components 20 may include a plurality of projections, shown as shear fingers 51. According to an alternative embodiment, shear fingers 51 may extend from another component. As shown in FIG. 4, shear fingers 51 extend through corresponding apertures in bracket 23, bracket 33, or sidewall armor component 44. According to an exemplary embodiment, toothed connections 46 interlock the various armor components together and provide additional structural integrity to the armor system. Structural integrity of the armor system may be particularly important during a blast condition (i.e. a loading condition where a pressure wave and shrapnel caused by the explosion of an IED impacts the armor system). Such toothed connections 46 may prevent the armor system from bending during a blast condition and may also prevent shearing or other damage of fasteners that may couple the various armor components together. The openings may also support or fasten the armor components together after a blast event.

As shown in FIG. 6, the underbody armor components 20 include a projection, shown as a shear finger 21. Such a shear finger 21 is configured to engage with an aperture or slot within the first front armor component 36. Shear finger 21 may prevent the underbody armor components 20 from moving upwards relative to first front armor component 36, prevent fasteners from shearing, and improve blast performance by lowering dynamic deflections.

According to an exemplary embodiment, vehicle 10 includes various armor components, shown as armor system 200. Armor system 200 may include the underbody armor components 20, bracket 23, bracket 33, sidewall armor component 44, first rear armor component 22, second rear armor component 24, first front armor component 36, and second front armor component 38, among other components. According to an alternative embodiment, vehicle 10 may not include armor system 200. By way of example, the armor system 200 may be releasably coupled with fasteners to tunnel 14 for removal from or addition to vehicle 10, as the operating conditions (e.g., in theater, training, etc.) of vehicle 10 require. Such a vehicle 10 may still maintain excellent blast, fragment, and ballistic protection by having the separate armor assembly in place. The ability to remove the armor system 200 may improve the versatility or efficiency of vehicle 10 by allowing a user to customize vehicle 10 to the current operating conditions.

Figure 5:
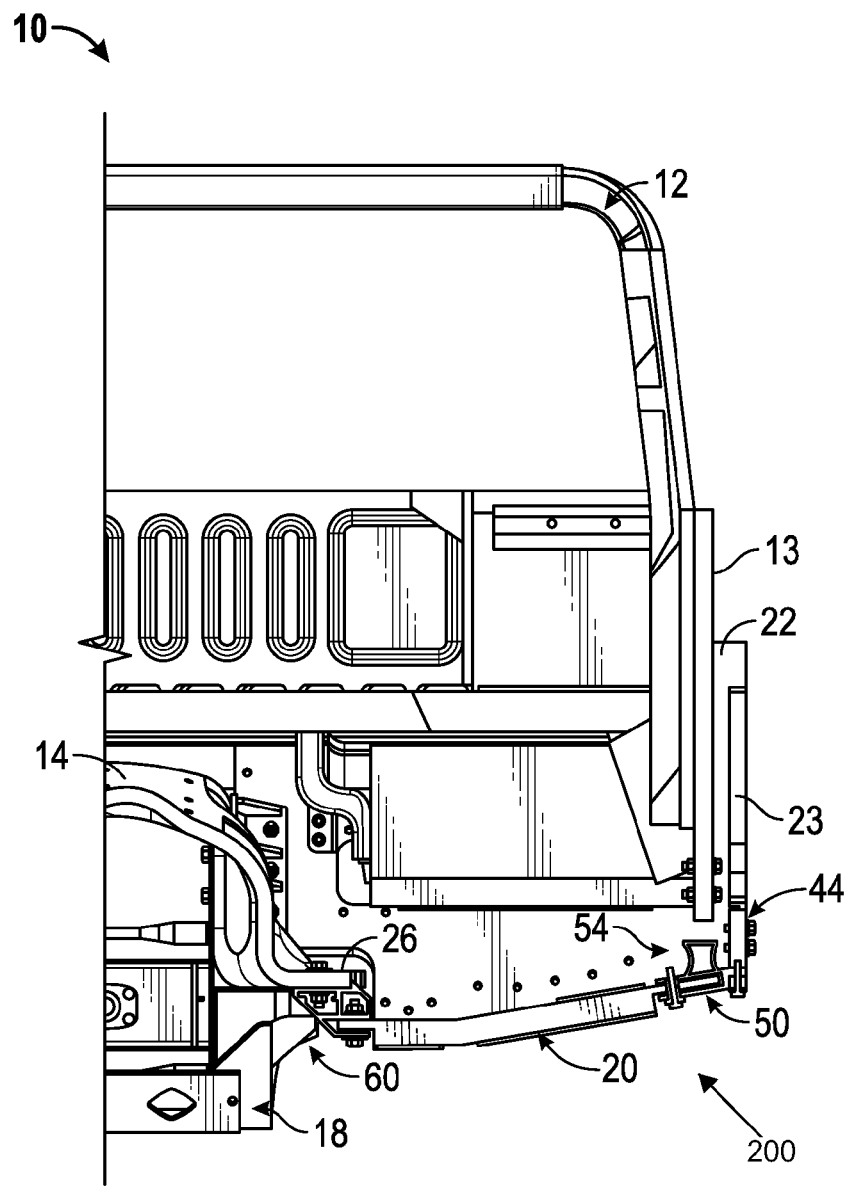
FIG. 5 is a detail view of a portion of the vehicle of FIG. 2, according to an exemplary embodiment.

Referring next to the exemplary embodiment shown in FIG. 5, the cab 12 is isolated (e.g., not rigidly coupled with, slidably coupled with, coupled with isolation mounts, offset, etc.) from the armor system 200 and other components of vehicle 10 (e.g., tunnel 14, the suspension system, and the axles, among others). According to an alternative embodiment, the cab 12 may be isolated from armor system 200 but coupled in a traditional fashion to the suspension system and the axles, among other components of vehicle 10. Isolation of cab 12 from at least armor system 200 may improve the survivability of the occupants within cab 12. During a blast condition, isolation allows a large mass (such as that of the armor system 200, tunnel 14, suspension system, and axles, etc.) to absorb and dissipate a large portion of the blast energy before it may impact the occupants within cab 12. Isolating cab 12 allows the cab 12 to move (e.g., flex, bend, rotate, translate, etc.) with at least some independence from the armor system 200 and the other components of vehicle 10. According to an exemplary embodiment, the cab 12 may be isolated and spaced a distance (e.g., 0.25 inches, 0.5 inches, 1.0 inches, 1.5 inches, etc.) from the armor system 200.

Due to this isolation, the weight of armor system 200 may not be supported by cab 12, and forces experienced by armor system 200 during a blast condition may not be transferred into cab 12. Isolating cab 12 from these loads may reduce the weight and complexity of cab 12 because cab 12 need not be designed to carry armor system 200 or survive transmitted loading during a blast condition. Isolating the cab 12 from the armor system 200 may also reduce deformation of cab 12 and vibrations experienced by occupants within cab 12 during a blast event.

As shown in FIGS. 4-5, overlap protection may be required where cab 12 is spaced a distance from armor system 200. Such overlap protection may include a plurality of plates that extend past one another to prevent debris, bullets, shrapnel, or other objects from impacting a portion of cab 12. According to the exemplary embodiment shown in FIGS. 4-5, sidewall armor components 44 extend upward from the underbody armor components 20 to provide overlap protection. Bracket 23 and bracket 33 may also provide overlap protection between the cab 12 and underbody armor components 20, first rear armor component 22, second rear armor component 24, first front armor component 36, and second front armor component 38. Where the armor system 200 is isolated from the cab 12, vehicle 10 may also include additional armor covering the sides of cab 12, shown as door armor 13. Such door armor 13 may be installed or removed independent of the components of armor system 200.

Referring again to FIGS. 5-6, armor system 200 includes a blast attenuation device, shown as crushable member 50. According to an exemplary embodiment, crushable member 50 is disposed between two components and may deform (e.g., distort, crush, bend, crumple, etc.) to absorb energy. Such absorption of energy by crushable member 50 reduces the blast energy received by other components of armor system 200. As shown in FIGS. 5-6, crushable member 50 is positioned between the underbody armor components 20 and the sidewall armor components 44. According to an exemplary embodiment, crushable member 50 includes a pair of arms 52 that form a slot, shown as groove 53 for coupling or overlapping an edge of the underbody armor components 20. Crushable member 50 also includes an energy absorbing portion, shown as crushable section 54. As shown in FIGS. 5-6, crushable section 54 has a rectangular cross-section with vertical members and horizontal members. According to an exemplary embodiment, the vertical members of crushable section 54 have a slight inward or concave curve that facilitates the controlled deformation of the crushable section 54. According to other alternative embodiments, the crushable section 54 may have a different configuration, position, orientation, or shape.

According to the exemplary embodiment shown in FIG. 5, the crushable section 54 is positioned below the door armor 13 for the cab door. During a blast event, a pressure wave from below the vehicle 10 may impact underbody armor components 20 and cause underbody armor components 20 to flex or bend. Such movement may cause crushable section 54 to move upward towards a lower edge of door armor 13. In such a configuration, the crushable section 54 may deform after an upper surface of crushable section 54 contacts the lower edge of door armor 13. Energy from the blast is expended in deforming the crushable section 54 thereby limiting the energy instead of transmitting it to the door armor 13 and the cab 12.

According to the exemplary embodiment shown in FIG. 6, the crushable member 50 forms a portion of toothed connection 46. As shown in FIG. 6, the shear fingers 51 are integrally formed with crushable member 50. According to an alternative embodiment, crushable member 50 may include an aperture configured to receive the shear fingers 51 disposed on underbody armor components 20. According to still other alternative embodiments, the shear fingers 51 may not extend through apertures within crushable member 50, crushable member 50 may not wrap around a portion of underbody armor components 20, or the shear fingers 51 may be positioned in another configuration. In such configurations, the crushable section 54 may be coupled (e.g., welded, fastened, integrally formed with, etc.) to an upper surface of the underbody armor components 20 and may not include the pair of arms 52.

According to the exemplary embodiment shown in FIGS. 6-7, underbody armor components 20 are coupled to the flange 26 of the tunnel 14 with a blast attenuation device, shown as crushable member 60. As shown in FIG. 7, crushable member 60 includes a plurality of energy absorbing portions, shown as first crushable section 61, a second crushable section 62, and a third crushable section 63. According to an exemplary embodiment, first crushable section 61, second crushable section 62, and third crushable section 63 are configured to protect the viability of couplers, shown as fastener 64 and fastener 65 during a blast event. As shown in FIG. 7, fastener 64 and fastener 65 may couple the underbody armor components 20 with the flange 26 of the tunnel 14. Such a first crushable section 61, second crushable section 62, and third crushable section 63 may be configured to deform (e.g., distort, crush, bend, crumple, etc.) as energy is transferred towards the cab 12 from underbody armor components 20 during a blast condition. Such deformation may prevent fastener 64 and fastener 65 from shearing thereby preserving the integrity of the joint between underbody armor components 20 and flange 26 during a blast event.

Figure 8:
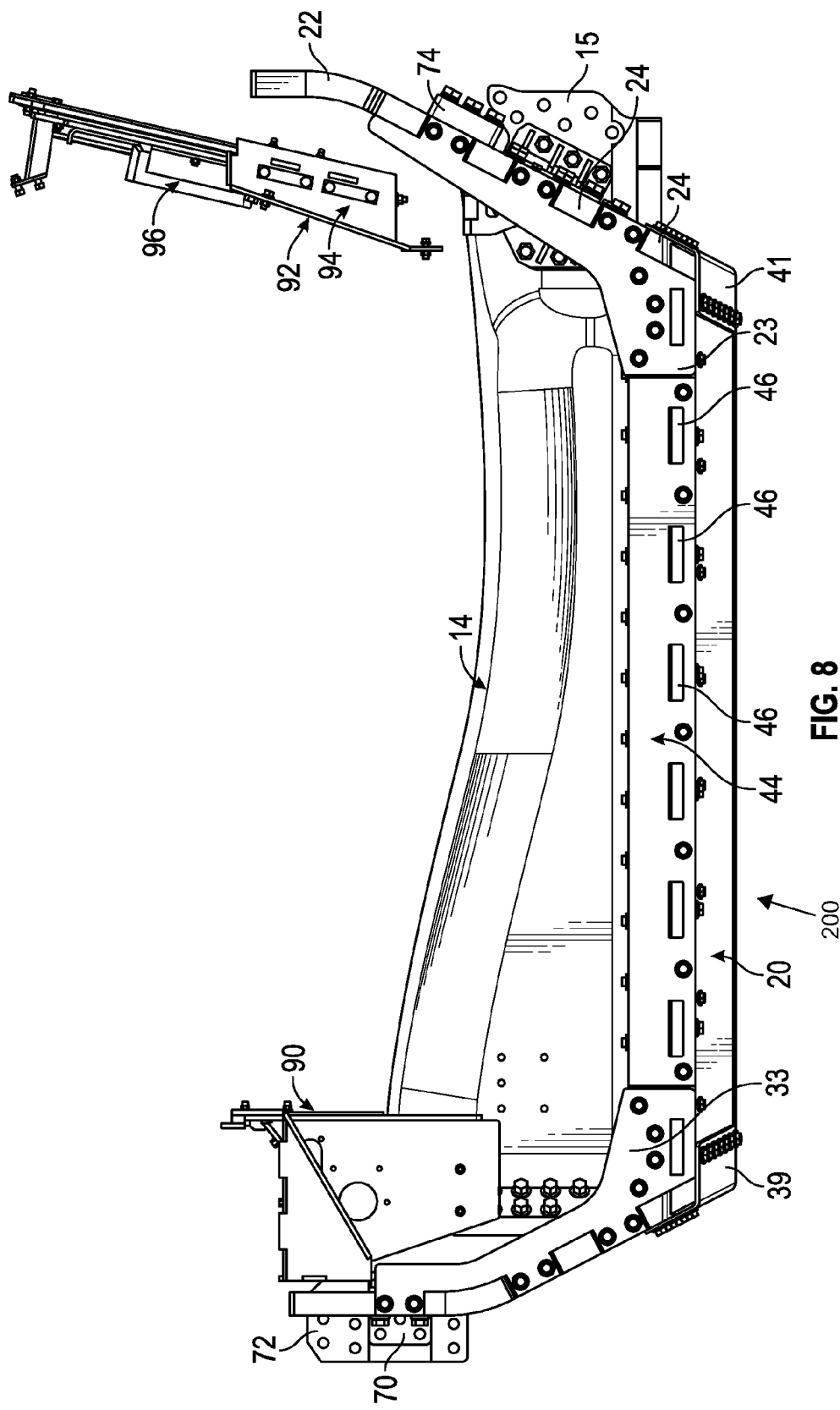
FIGS. 8-10 are various perspective views of the armor system for the vehicle of FIG. 1, according to an exemplary embodiment.
Figure 9:
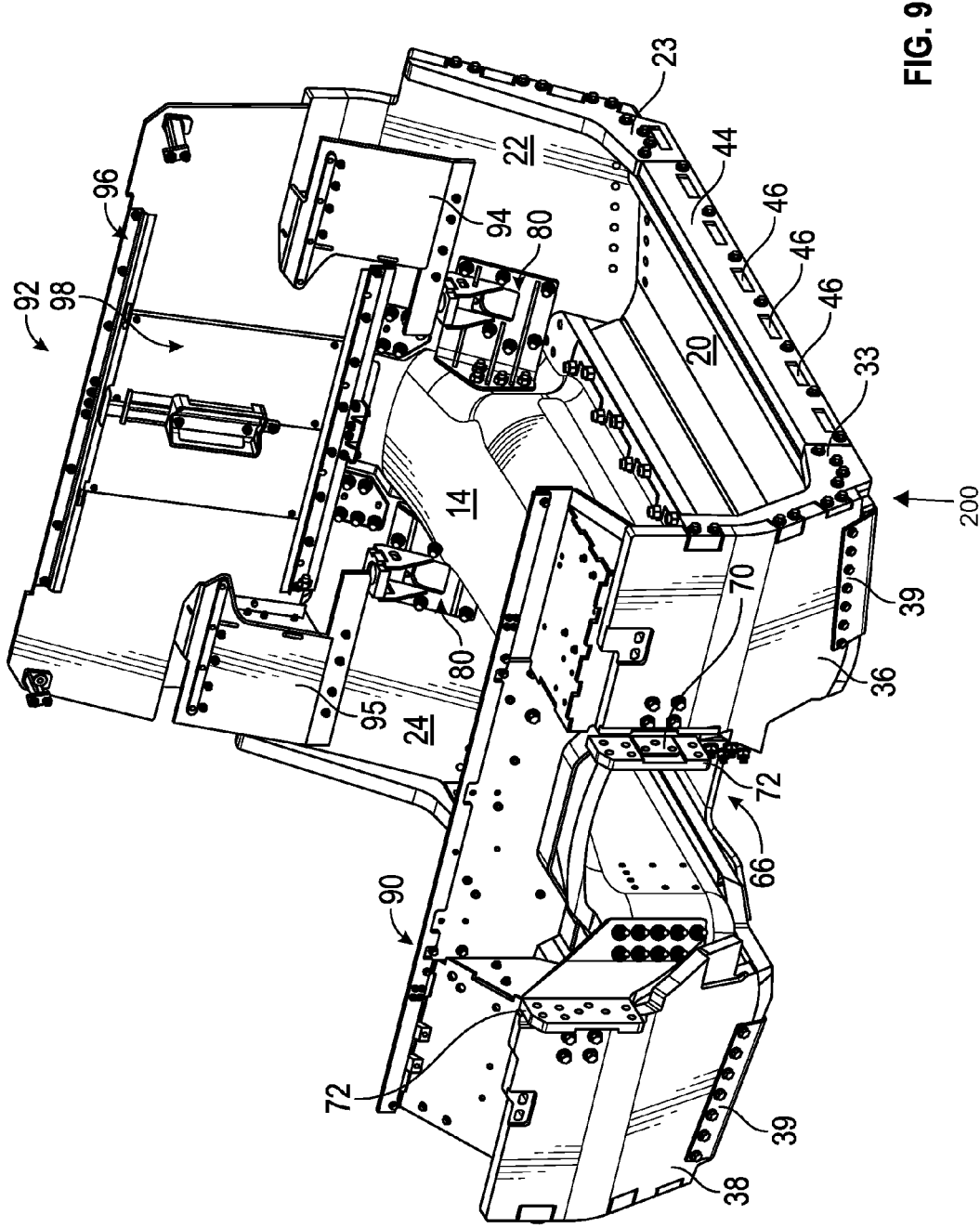
Figure 10:
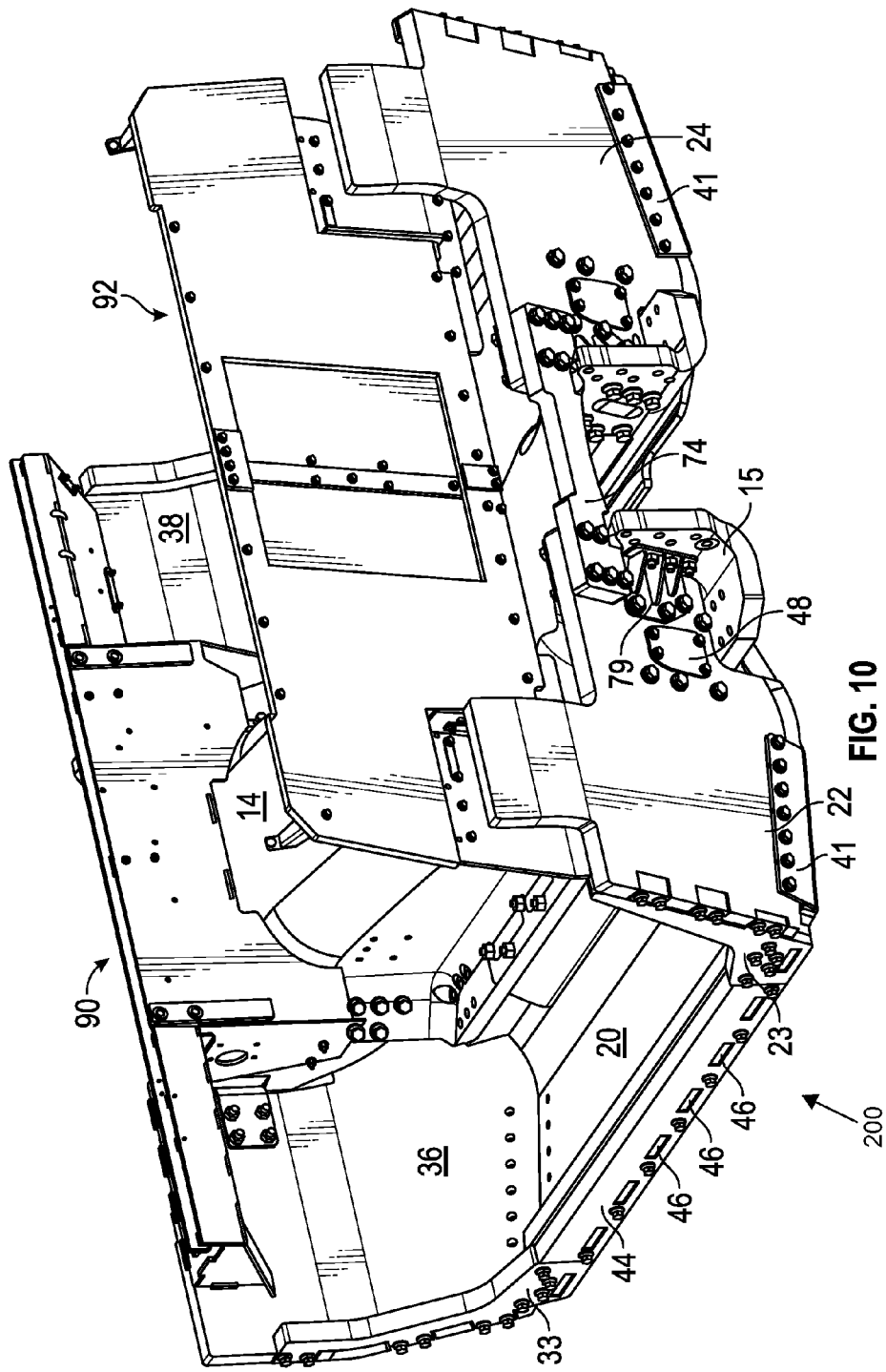

Referring next to FIGS. 8-10, the armor system 200 for vehicle 10 is shown, according to an exemplary embodiment. As shown in FIGS. 8-10, the armor system 200 includes the underbody armor components 20, bracket 23, bracket 33, sidewall armor component 44, first rear armor component 22, second rear armor component 24, first front armor component 36, and second front armor component 38, among other components. According to an exemplary embodiment, the armor system 200 also includes a forward armor section, shown as front cab armor 90 and a rearward armor section, shown as rear cab armor 92.

As shown in FIG. 9, front cab armor 90 extends across the front of cab 12 to protect occupants of the vehicle. Such front cab armor 90 may be comprised of various materials (e.g., steel, aluminum, a composite, etc.) and formed in a range of thicknesses (e.g., 0.5 inches, 1.0 inches, etc.). Front cab armor 90 may be formed of a single piece or may comprise various components coupled (e.g., welded, bolted, adhesively secured, etc.) together. According to an exemplary embodiment, a first portion of the front cab armor 90 is coupled to an upper end of the first front armor component 36 and a second portion of the front cab armor 90 is coupled to an upper end of the second front armor component 38. Such a front cab armor 90 may extend the entire width of cab 12. As shown in FIG. 9, front cab armor 90 also includes a lower portion extending downward toward tunnel 14.

Referring still to FIG. 9, rear cab armor 92 extends along the rear of cab 12 to protect occupants of the vehicle. Such rear cab armor 92 may be comprised of various materials (e.g., steel, aluminum, a composite, etc.) and formed in a range of thicknesses (e.g., 0.5 inches, 1.0 inches, etc.). Rear cab armor 92 may be formed of a single piece or may comprise various components coupled (e.g., welded, bolted, adhesively secured, etc.) together. According to an exemplary embodiment, rear cab armor 92 includes a first armor component, shown as first portion 94 and a second armor component, shown as second portion 95. As shown in FIG. 9, the first portion 94 is coupled to an upper end of the first rear armor component 22 and the second portion 95 is coupled to an upper end of the second rear armor component 24. According to an exemplary embodiment, rear cab armor 92 includes an armored access, shown as rear door frame 96 configured to receive an armored hatch, shown as rear doors 98. Such rear cab armor 92 may allow for occupants to enter or exit the vehicle 10 by opening (e.g., sliding, swinging, etc.) rear doors 98 into an open position. As shown in FIGS. 9-10, the rear door frame 96 extends between the first portion 94 and the second portion 95. Rear door frame 96 may also include an elevated armor panel extending above the first portion 94 and the second portion 95. According to an exemplary embodiment rear cab armor 92 extends the entire width of cab 12 or armor system 200. According to various alternative embodiments, rear cab armor 92 may not include rear door frame 96 or rear doors 98, or rear door frame 96 may comprise a plate member not configured to receive rear doors 98.

Armor system 200 of vehicle 10 may offer 180 degree protection to the occupants positioned within passenger compartment 40. As shown in FIG. 4, the armored protection begins at a front firewall of the cab, extends along the bottom of cab (e.g., along the floor pan or foot wells of the passenger compartment), and projects upwards along the rear wall of the cab. According to the exemplary embodiment where vehicle 10 includes tunnel 14 without additional frame members, front cab armor 90 extends across the entire surface of a front firewall of vehicle 10 and rear cab armor 92 extends across an entire rear surface of cab 12.

Referring again to the exemplary embodiment shown in FIGS. 8-10, armor system 200 includes a first coupler, shown as bracket 39 and a second coupler, shown as bracket 41. As shown in FIGS. 8-10, a bracket 39 is included to couple a lower portion of first front armor component 36 and second front armor component 38 to the underbody armor components 20. Similarly, bracket 41 is included to couple first rear armor component 22 and second rear armor component 24 to the underbody armor components 20. According to an alternative embodiment, armor system 200 may not include bracket 39 or bracket 41.

As shown in FIG. 10, first rear armor component 22 and second rear armor component 24 are each coupled to a portion of the tunnel 14, shown as rear portion 15. According to an exemplary embodiment, such coupling is achieved through a support, shown as back bracket 79. According to an exemplary embodiment, first rear armor component 22 and second rear armor component 24 are also coupled together with a brace, shown as support bracket 74. As shown in FIG. 10, the rear portion 15 of tunnel 14 includes a plurality of apertures configured to receive fasteners that couple rear sub-frame 18 to tunnel 14. According to an alternative embodiment, rear sub-frame 18 may be coupled to tunnel 14 using another known method (e.g., welding, adhesively joined, etc.) or rear sub-frame 18 may be coupled to another component of armor system 200. According to an alternative embodiment, the various sub-frames or standard frame rails may be coupled to another portion of tunnel 14 such as to lower flanges, to the upper curved portion, or to the tunnel through the surrounding armor components.

According to an exemplary embodiment, the various components of the armor system 200 are bent or forged. According to various alternative embodiments, the components may be formed using another suitable method. By way of example, the various components of the armor system 200 may be cast, stamped, formed, molded, etc. as components or may each include various sub-components joined (e.g., assembled, fastened, bolted, welded, adhesively secured) together. According to an exemplary embodiment, the various components of the armor system 200 are constructed from aluminum. According to various alternative embodiments, the components of armor system 200 may be constructed from a material selected to perform well during a blast or fragmentation event. By way of example, the various components of the armor system 200 may be constructed from an aluminum alloy, steel, a composite (e.g., fiberglass, Kevlar, etc.), or another suitable material. According to an exemplary embodiment, the various components of armor system 200 may be formed in a range of thicknesses (e.g., 0.5 inches, 1.0 inches, etc.). Such thickness may vary depending on the weight and protection requirements for vehicle 10.

Figure 11:
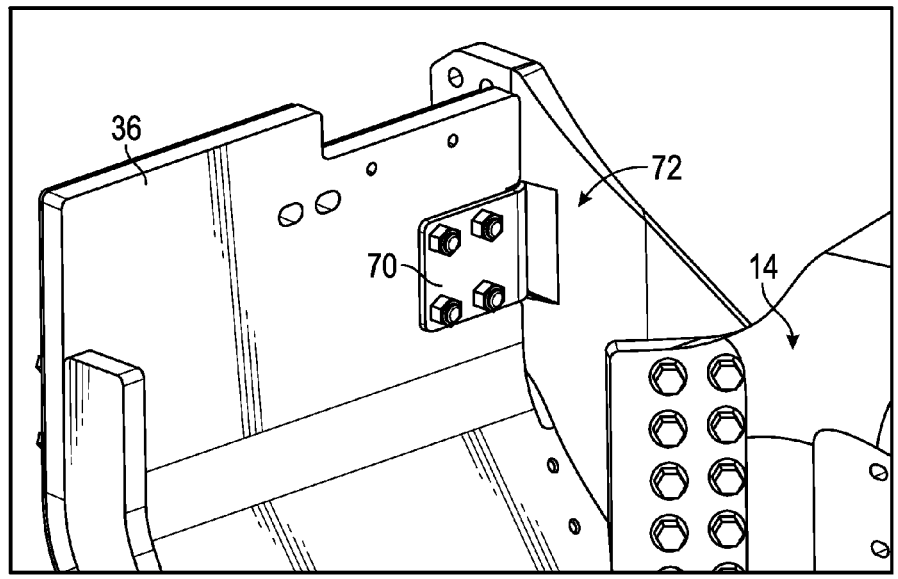
FIG. 11 is a partial perspective view of various bracket components for the armor system of FIGS. 8-10, according to an exemplary embodiment.

Referring now to the exemplary embodiment shown in FIG. 11, armor system 200 includes a support member, shown as intermediate bracket 72. Such an intermediate bracket 72 couples the first front armor component 36 with the tunnel 14. As shown in FIG. 11, the intermediate bracket 72 is coupled to an inner edge of the first front armor component 36. Such coupling is further strengthened with the use of a support, shown as coupling bracket 70. According to an alternative embodiment, first front armor component 36 may be designed to couple directly with the tunnel 14 (i.e. without the use of intermediate brackets). According to an exemplary embodiment, tunnel 14 is coupled to the front sub-frame 16 and the rear sub-frame 18 with brackets extending along the length of the tunnel 14. The location of such brackets more efficiently transfers loading from the front sub-frame 16 and the rear sub-frame 18 into the tunnel 14.

Figure 12:
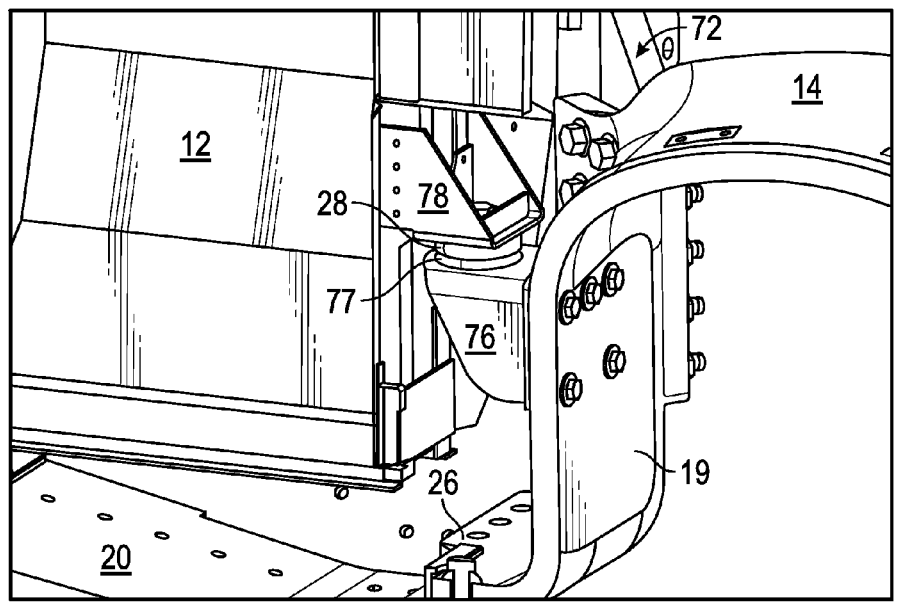
FIG. 12 is a partial perspective view of a front isolation mount for the vehicle of FIG. 1, according to an exemplary embodiment.

According to the exemplary embodiment shown in FIG. 12, cab 12 is coupled to the other components of vehicle 10 through an isolator shown as isolator 28. As shown in FIG. 12, a first bracket, shown as cab mount bracket 76 is coupled to an extended portion of tunnel 14, shown as sidewall 19, and the cab mount bracket 76 is positioned along the length of sidewall 19 proximate a front end of the tunnel 14. According to an exemplary embodiment, the cab mount bracket 76 includes two flanges coupled by a top surface.

As shown in FIG. 12, cab mount bracket 76 includes a mounting pad, shown as circular portion 77 coupled to the top portion of the cab mount bracket 76 and configured to receive isolator 28. According to the exemplary embodiment shown in FIG. 12, cab 12 is coupled to the other components of vehicle 10 only through isolator 28. According to an exemplary embodiment, isolator 28 is a known isolation device and may comprise rubber or another substance. According to an exemplary embodiment, the durometer of the rubber is varied to meet the specific application of the vehicle. As shown in FIG. 12, the isolator 28 comprises one piece of rubber. According to an alternative embodiment, isolator 28 may comprise two or more pieces coupled together. The design (e.g., number of pieces, etc.) of isolator 28 may vary depending on the specific application and characteristics of vehicle 10.

Referring still to the exemplary embodiment shown in FIG. 12, armor system 200 also includes a support member, shown as body mount bracket 78. As shown in FIG. 12, body mount bracket 78 is coupled to the cab 12. According to an exemplary embodiment, contact between body mount bracket 78, isolator 28, and cab mount bracket 76 is maintained through the use of a fastener, such as a bolt. According to an exemplary embodiment, the vehicle 10 includes one isolation mount positioned on each front end of tunnel 14.

Figure 13:
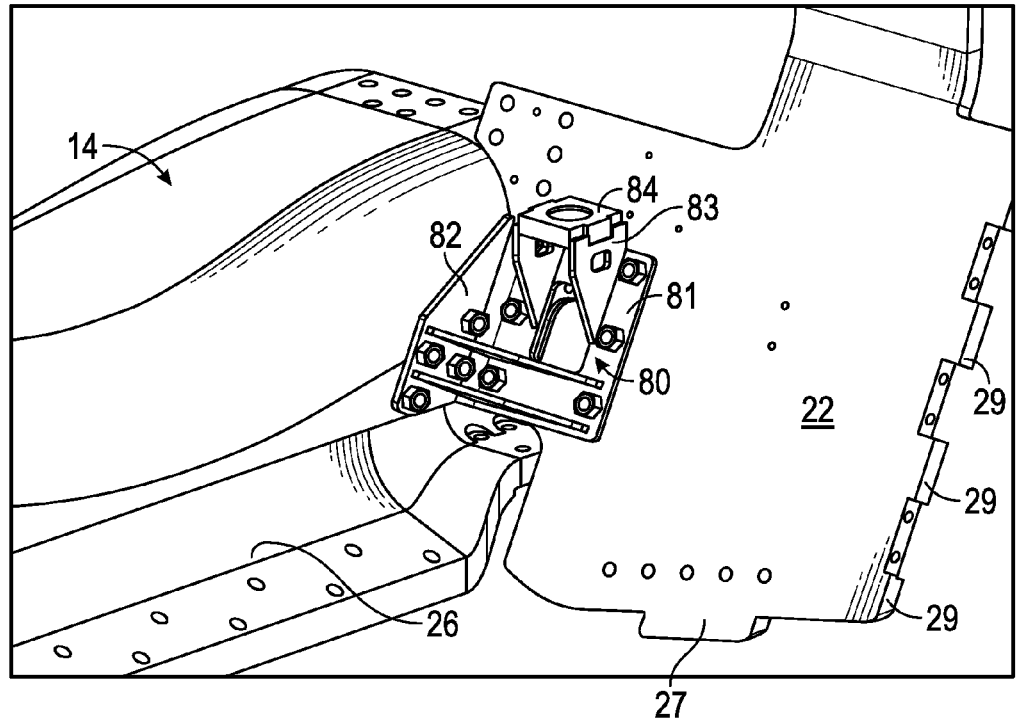
FIGS. 13-14 are partial perspective views of a rear isolation mount for the vehicle of FIG. 1, according to an exemplary embodiment.
Figure 14:
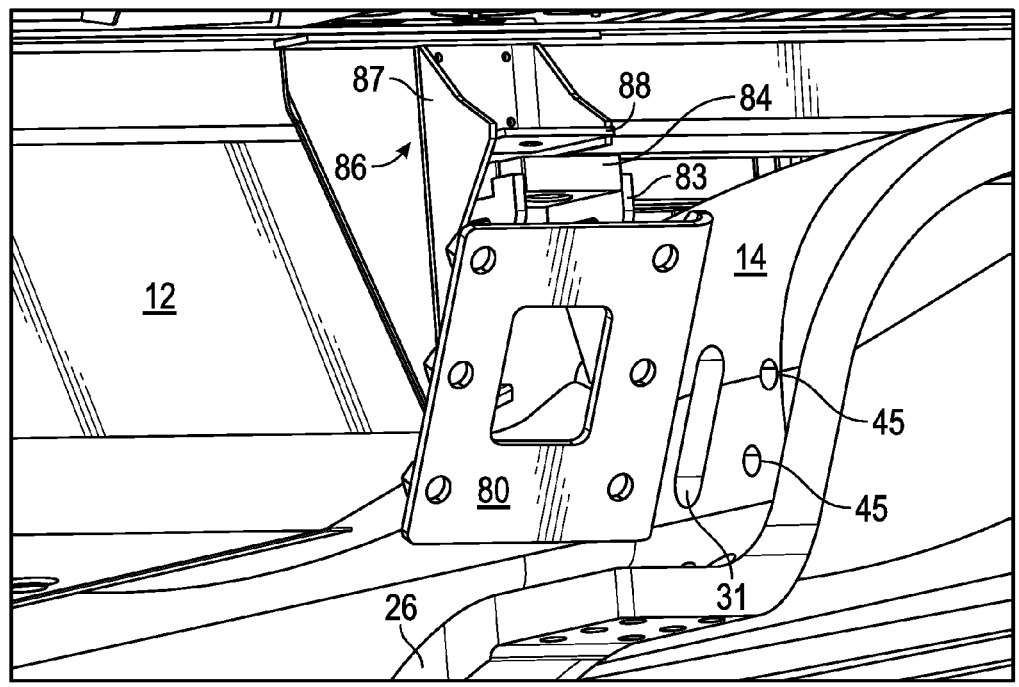

Referring next to the exemplary embodiment shown in FIGS. 13-14, cab 12 is coupled at the rear of vehicle 10 through a rear support, shown as bracket 80 and rear body support, shown as body mount bracket 86. As shown in FIG. 13, bracket 80 includes a plate, shown as first portion 81 coupled to the first rear armor component 22. Bracket 80 also includes an aperture aligned with a corresponding aperture in the first rear armor component 22 for accessing (e.g., to decouple, etc.) the rear isolation mount. Such corresponding apertures are covered with a removable protection plate, shown as cover plate 48 in FIG. 10. According to an alternative embodiment, bracket 80 may also include various ribs or support members for improving the rigidity of the bracket 80. Bracket 80 also includes a plate, shown as second portion 82 coupled to the tunnel 14 and a pair of flanges, shown as sides 83 coupled to a plate, shown as middle portion 84. As shown in FIG. 13, middle portion 84 includes an aperture, configured to receive a fastener. As shown in FIG. 14, body mount bracket 86 is coupled to the cab 12. According to an exemplary embodiment, the body mount bracket 86 includes a pair of plates, shown as sides 87 coupled by a mounting plate, shown as middle portion 88. According to an exemplary embodiment, middle portion 88 includes an aperture configured to receive a fastener disposed through an isolator.

Referring still to FIG. 14, tunnel 14 includes an opening, shown as slot 31 configured to receive a projection coupled to first rear armor component 22 thereby forming a toothed connection. As shown in FIG. 14, tunnel 14 also includes a plurality of voids, shown as apertures 45 configured to receive fasteners for coupling the first rear armor component 22 and second rear armor component 24 to the tunnel 14 through back bracket 79.

Figure 16:
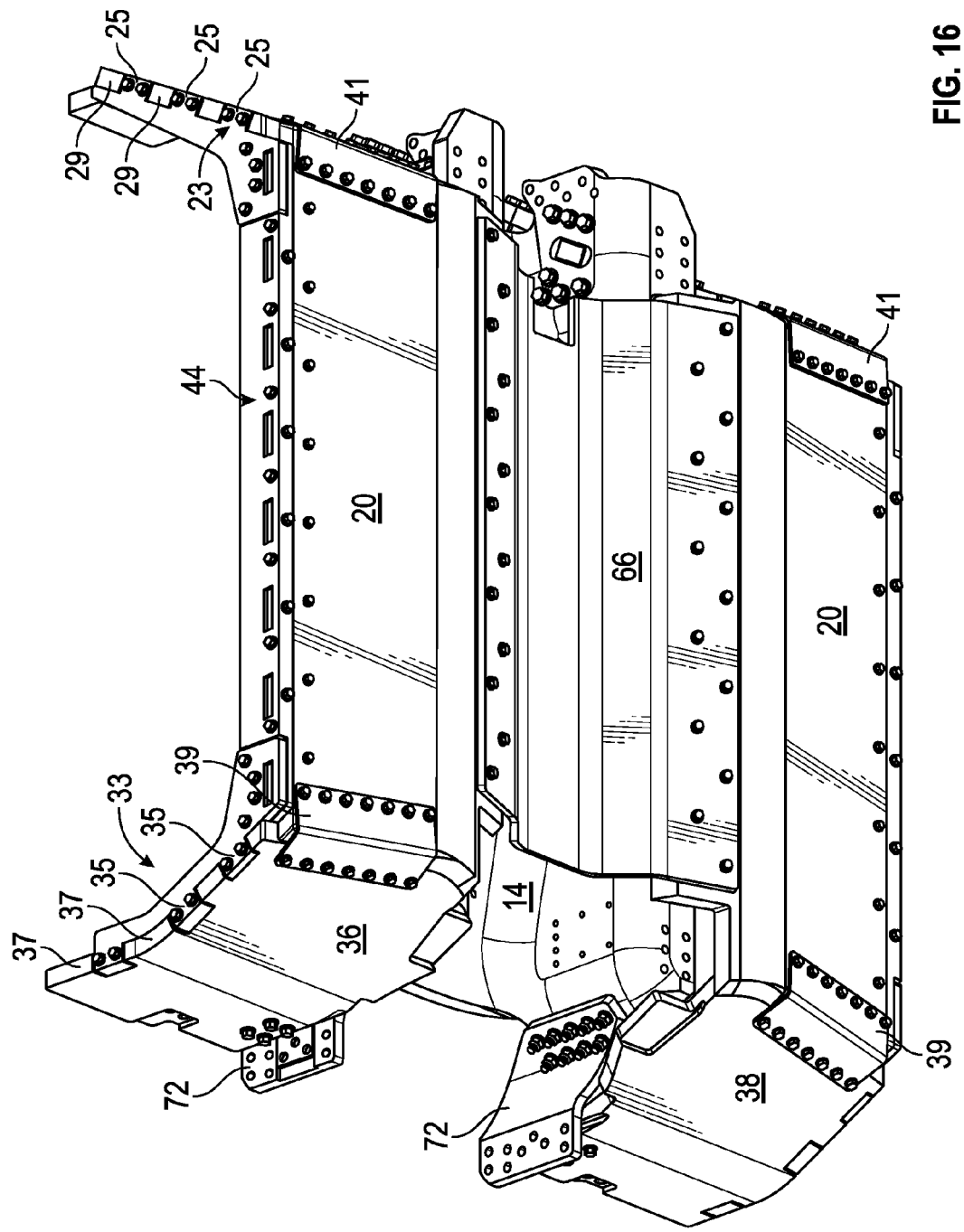
FIGS. 16-18 are various perspective views of a plate coupled to the armor system for the vehicle of FIG. 1, according to an exemplary embodiment.

According to the exemplary embodiment shown in FIGS. 13 and 16, the first rear armor component 22 includes a bottom coupling portion (i.e. tooth, tab, etc.), shown as projection 27 and a side coupling portion (i.e. tooth, tab, etc.), shown as projection 29. As shown in FIG. 13, projection 27 and projection 29 are integrally formed with edges of the first rear armor component 22. According to an alternative embodiment, first rear armor component 22 may include only projection 27 or only projection 29. Projection 27 and projection 29 may be integrally formed with or otherwise fastened (e.g., bolted, welded, adhesively secured, etc.) to first rear armor component 22. As shown in FIG. 16, the projection 27 engages with corresponding features (e.g., projections, slots, etc.) of the underbody armor components 20, and the projection 29 engages with a corresponding portion (i.e. tooth, tab, etc.), shown as projection 25 of the bracket 23.

As shown in FIG. 16, the corresponding first front armor component 36, second front armor component 38, and brackets 33 may also include toothed connections. First front armor component 36 includes a coupling portion (i.e. projections, tabs, etc.), shown as teeth 37 that engage or interlock with a corresponding coupling portion (i.e., projections, tabs, etc.) shown as teeth 35 of the bracket 33. The various toothed joints that couple the armor panels together may improve the integrity of armor system 200. Joints having an interlocking tooth design may further improve the integrity of armor system 200 by preventing shearing of the fasteners and distributing blast energy to the various coupled components of armor system 200. Such prevention of fastener shear and energy absorption may also improve occupant and vehicle survivability after a blast event.

Figure 15:
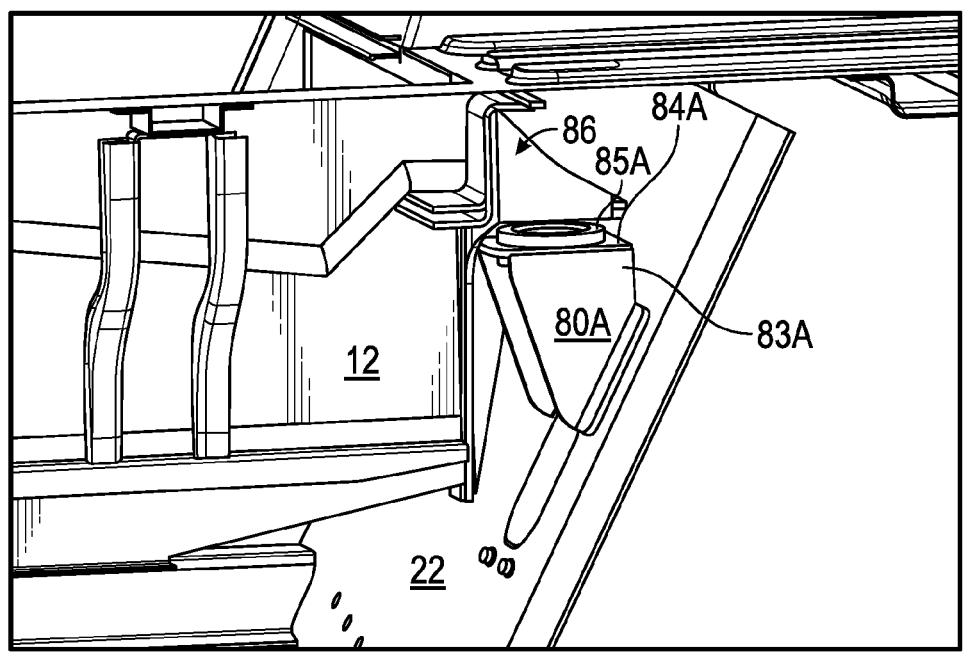
FIG. 15 is a partial perspective view of a rear isolation mount for the vehicle of FIG. 1, according to another exemplary embodiment.

According to the exemplary embodiment shown in FIG. 15, vehicle 10 includes a rear isolation mount. As shown in FIG. 15, the rear isolation mount includes a first bracket, shown as cab mount bracket 80A coupled to the first rear armor component 22. Such a rear isolation mount also includes a first and a second flange, shown as sides 83A that support an upper wall, shown as middle portion 84A. According to an exemplary embodiment, middle portion 84A supports a mounting interface, shown as mounting pad 85A. Such a mounting pad 85 may be configured to support an isolator. As shown in FIG. 15, the rear isolation mount also includes a bracket, shown as body mount bracket 86 coupled to the cab 12. According to an exemplary embodiment, an isolator couples the cab mount bracket 80A and the body mount bracket 86. This configuration isolatingly couples the cab 12 to the tunnel 14 with the first rear armor component 22.

According to an exemplary embodiment, the vehicle 10 includes four isolation mounts. By way of example, one isolation mount may be located adjacent each corner of the cab. According to an alternative embodiment, the vehicle 10 may include more or fewer isolation mounts. Having isolation mounts isolates the cab 12 from vibrations or forces acting on the armor components. Such vibrations or forces may occur from natural phenomenon such as uneven terrain or other phenomenon such as a blast event.

Figure 17:
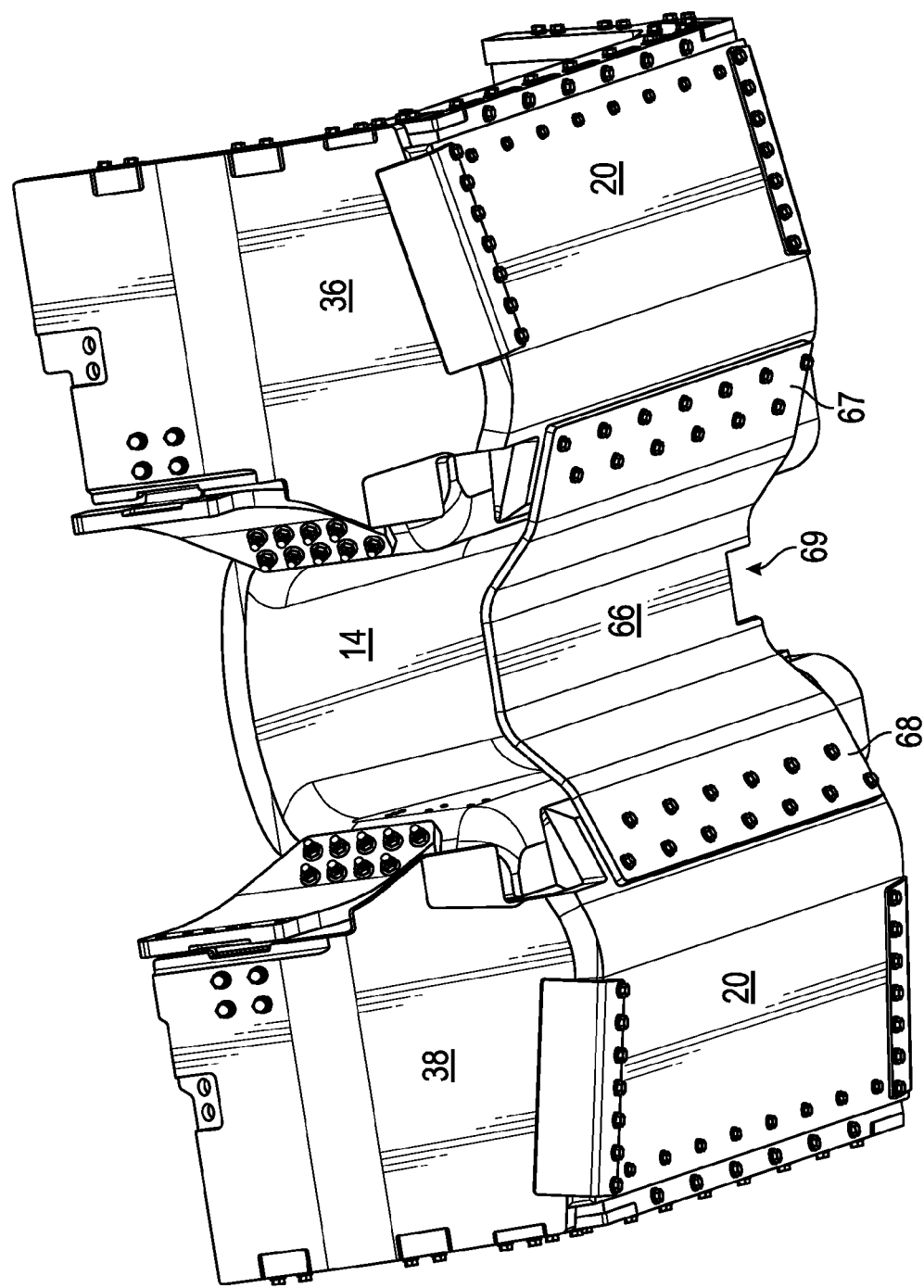
Figure 18:
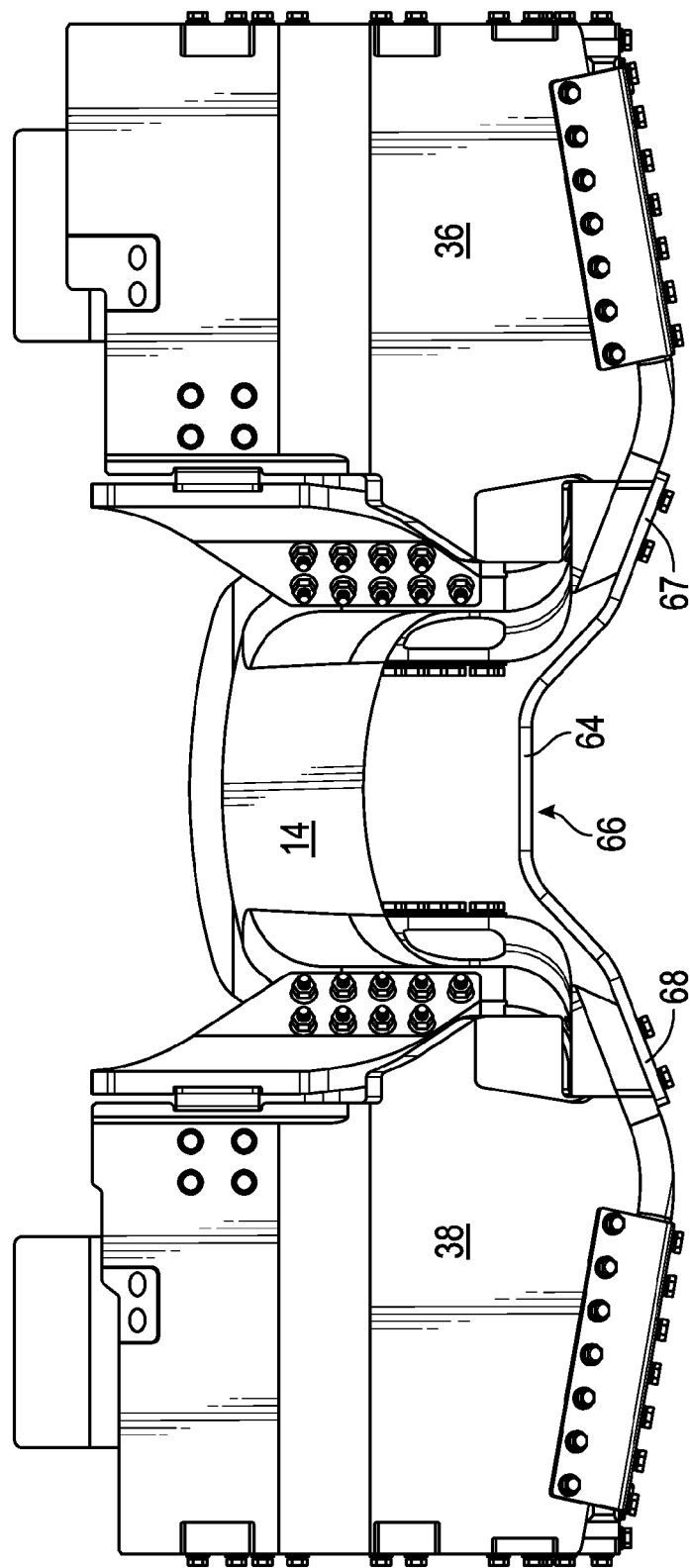
Figure 19:
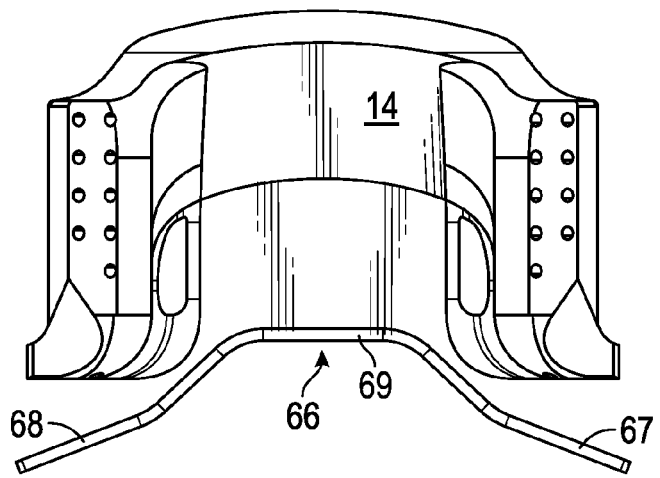
FIG. 19 is an end view of the plate of FIGS. 16-18, according to an exemplary embodiment.

According to the exemplary embodiment shown in FIGS. 16-19, armor system 200 includes a shielding member, shown as a plate 66. As shown in FIGS. 16-19, the plate 66 includes a first portion 67 and a second portion 68. According to an exemplary embodiment, first portion 67 and second portion 68 are angled to allow for blast energy to reflect towards the middle of the vehicle, and the first portion 67 and the second portion 68 may be coupled to an angled portion of underbody armor component 20. According to an exemplary embodiment, the plate 66 includes a raised middle portion 69 disposed between the first portion 67 and the second portion 68. As shown in FIGS. 16-18, the plate 66 is positioned below the tunnel 14 and extend from a front of the tunnel 14 to a rear of the tunnel 14.

Figure 20:
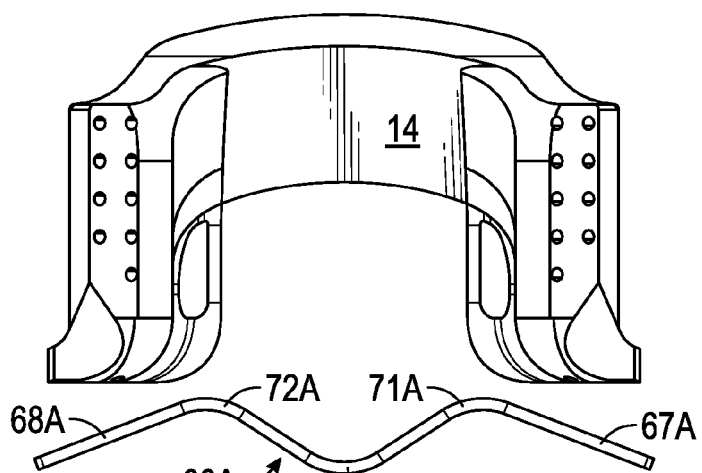
FIG. 20 is an end view of a plate, according to another exemplary embodiment.
Figure 21:
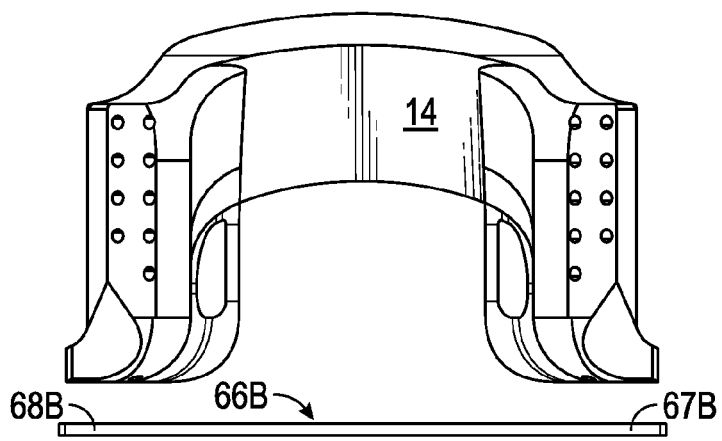
FIG. 21 is an end view of a plate, according to yet another exemplary embodiment.

According to the alternative embodiments shown in FIG. 20-21, the shielding member may have a different contour. As shown in FIG. 20, a shielding member, shown as a plate 66A includes a first portion 67A and a second portion 68A. Unlike the raised middle portion 69 of plate 66, the plate 66A includes a depressed middle portion 69A positioned between a first raised portion 71A and a second raised portion 72A. Such a plate 66A may be coupled to the armor system 200 of the vehicle 10 and may be positioned below tunnel 14.

According to an alternative embodiment shown in FIG. 21, a shielding member, shown as a plate 66B is a generally flat plate. Such a plate 66B may include a first end 67B and a second end 68B. According to an alternative embodiment, plate 66B may be coupled to the armor system 200 of the vehicle 10 in a manner similar to the plate 66. According to an alternative embodiment, plate 66B may be directly coupled to the tunnel 14.

According to an exemplary embodiment, shielding members, such as plates 66, 66A, and 66B dissipate the energy of a bomb blast released during a blast event. According to an alternative embodiment, armor system 200 may include various members having a larger "V" shape that extends downwards toward the ground surface, where clearance allows. The dissipation of plates 66, 66A, and 66B may provide additional protection to the occupants of vehicle 10. By way of example, shielding members may prevent a portion of the initial blast energy from contacting the tunnel 14 and funnel energy towards the front and back of vehicle 10. Shield members may also help to reduce the speed and distribute the effect of the blast thereby lowering the amount of force eventually exerted on the tunnel 14 and eventually to occupants within the cab 12. According to an exemplary embodiment, such shielding members may be manufactured from plates that are less thick than standard armor (e.g., to serve as sacrificial plates failing upon impact) or from plates that are thick enough to prevent failure.

According to the various exemplary embodiments, the drive train components of the vehicle may be provided above, below, or a combination of both above and below the shielding members. According to an alternative embodiment, the armor system for the vehicle may be configured for use with or without a shielding plate. Where the armor system includes a shielding plate, such a shielding plate may be coupled to the other components of the armor assembly with a crushable member.

Referring next to the alternative embodiment shown in FIGS. 22-25, an armored vehicle, shown as vehicle 110 includes a body (e.g., cabin, housing, etc.), shown as cab 112 and structural frame members, shown as frame rails 114. According to an exemplary embodiment, the cab 112 is coupled (e.g., bolted, welded, adhesively secured, etc.) to the frame rails 114. According to an alternative embodiment, the cab 112 may be coupled to the frame rails 114 using isolators to provide shock absorption and isolation of vibrations, among other benefits. According to an exemplary embodiment, the cab 112 includes a passenger area, shown as occupant compartment 140 and a bed, shown as cargo area 142.

Figure 22:
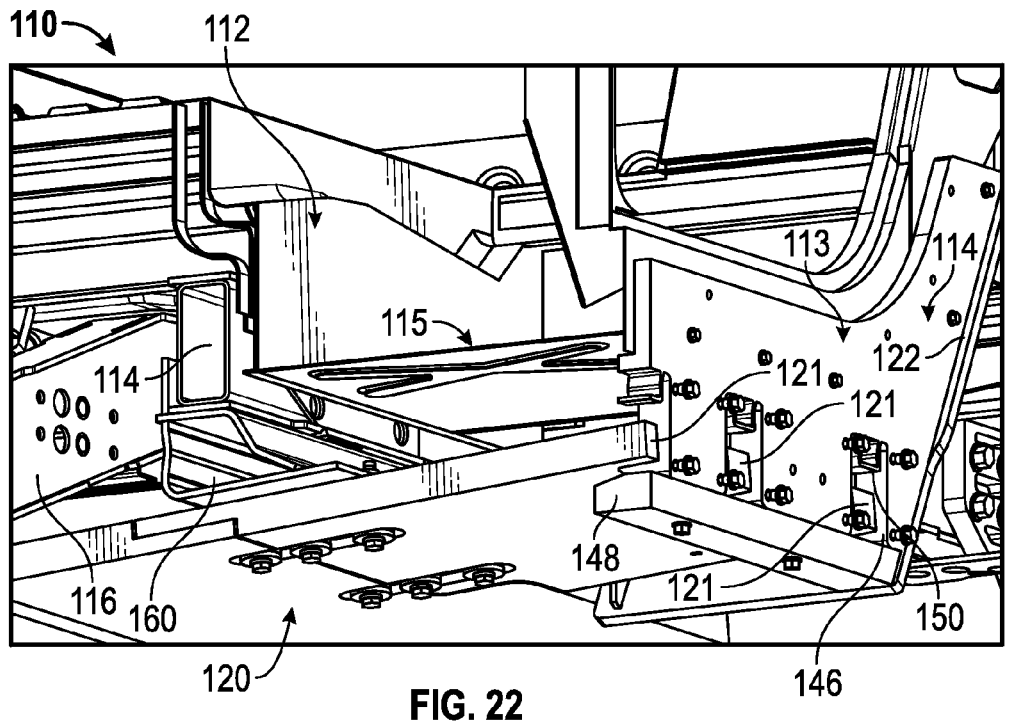
FIG. 22 is a partial cutaway perspective view of various armor components for a vehicle, according to another exemplary embodiment.

According to the exemplary embodiment shown in FIG. 22, the vehicle 110 includes at least one energy absorbing portion, shown as crushable member 160. Such a crushable member 160 couples an armor plate, shown as underbody armor component 120 to the frame rails 114. Such coupling may be accomplished with various fasteners. According to an exemplary embodiment, the crushable member 160 is configured to deform (e.g., distort, crush, bend, crumple, etc.) during a blast event where the underbody armor component 120 is subjected to blast forces and debris. Such a crushable member 160 reduces the likelihood that the fasteners coupling the underbody armor component 120 to crushable member 160 will fail (e.g., break, shear, etc.) thereby maintaining the integrity of the underbody armor component 120.

Figure 25:
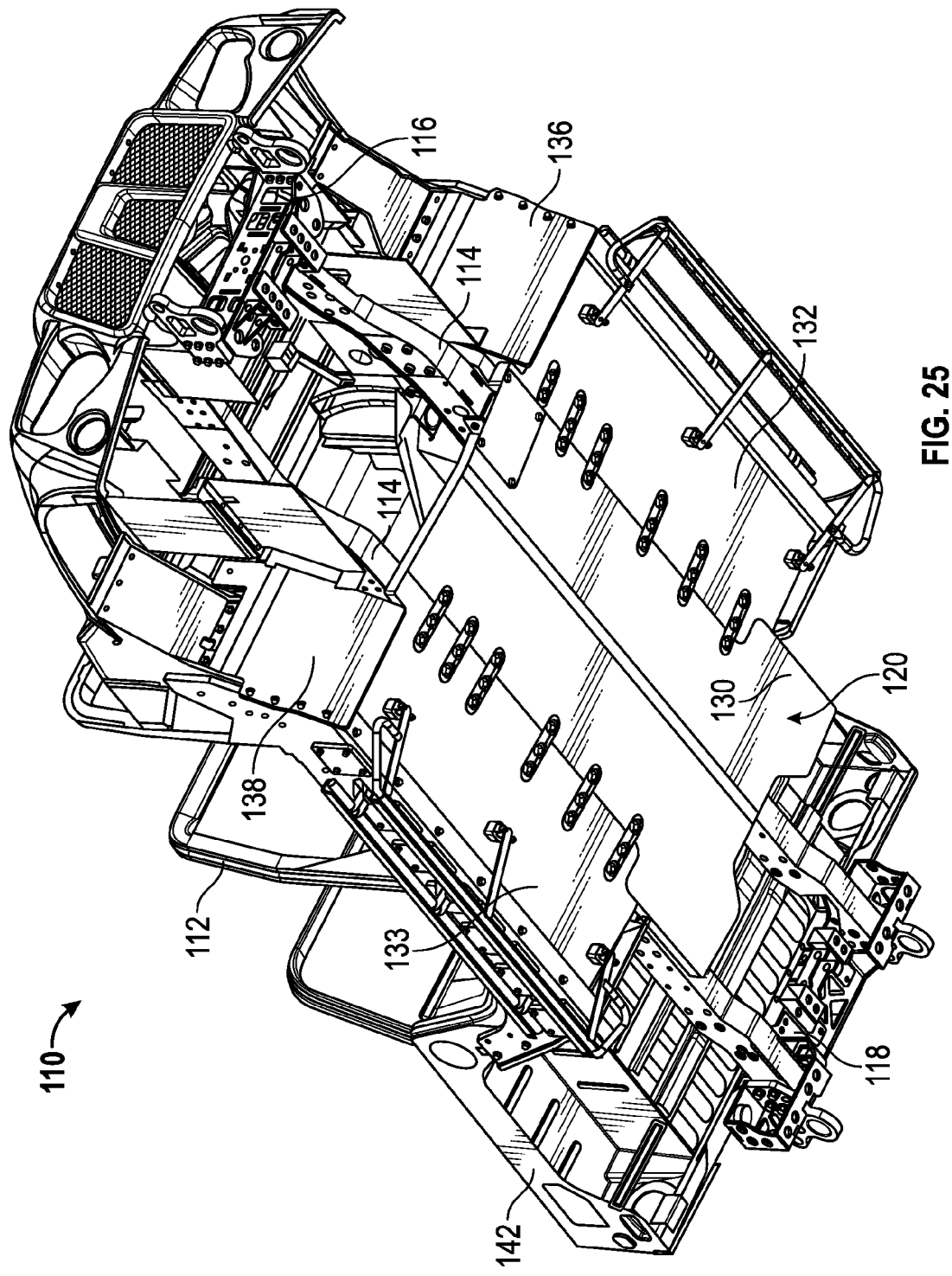
FIG. 25 is a bottom perspective view of various armor components for the vehicle of FIG. 22, according to an exemplary embodiment.

As shown in FIG. 25, vehicle 110 includes a first frame (e.g., suspension sub-frame, etc.) shown as front sub-frame 116 coupled to a front portion of frame rails 114. Vehicle 110 also includes a second frame (e.g., suspension sub-frame, etc.) shown as rear sub-frame 118 coupled to a rear portion of frame rails 114. According to an exemplary embodiment, the front sub-frame 116 and the rear sub-frame 118 are configured to support an axle and suspension system. By way of example, the front sub-frame 116 supports a front axle and front suspension system, and the rear sub-frame 118 supports a rear axle and rear suspension system. The vehicle may also include a power source or prime mover (e.g., diesel engine, gasoline engine, electric motor, etc.) powering a drive train (e.g., driveline). The drive train may include a transmission, a driveshaft, and axles, among other components.

According to an exemplary embodiment, the vehicle 110 may be designed to survive a blast from an IED or a landmine by allowing explosive energy of the blast to pass around components of the vehicle. Such a vehicle may also absorb, deflect, and dissipate the blast by specific components of the vehicle. In some embodiments, the vehicle may be a military vehicle such as a high mobility multi-purpose wheeled vehicle (HMMWV), a mine resistant ambush protected (MRAP) vehicle, a heavy expanded mobility tactical truck (HEMTT), or other military vehicle. In other contemplated embodiments, the vehicle may be one of a broad range of vehicles (e.g., semi truck, construction equipment, troop transport, aircraft, amphibious vehicle, etc.), having a structure designed to mitigate harm caused by an explosive blast directed toward the undercarriage of the vehicle.

According to the exemplary embodiment shown in FIGS. 22 and 25, the underbody armor component 120 includes various components coupled (e.g., fastened, welded, adhesively secured, etc.) together. As shown in FIG. 25, the underbody armor component 120 includes a frame, shown as center section 130, an armor panel, shown as first outer section 132, and an armor panel, shown as outer section 133. Such an underbody armor component 120 may be removable from the vehicle 110. By way of example, the underbody armor component 120 may be decoupled (e.g., unfastened, unbolted, detached, etc.) from the frame rails 114 of the vehicle 110. Such a vehicle having a decoupled underbody armor component 120 may be operated without the underbody armor component 120. Such decoupling allows greater variability and speed of changeover in the field, depending on the specific application of the vehicle 110.

Figure 23:
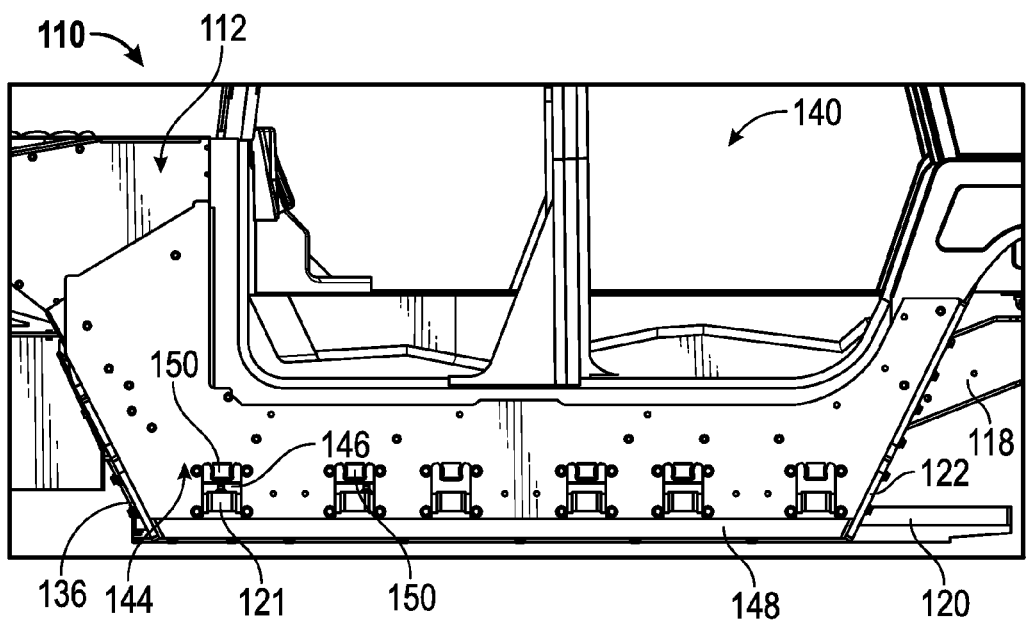
FIG. 23 is a partial side view of the vehicle of FIG. 22, according to an exemplary embodiment.
Figure 24:
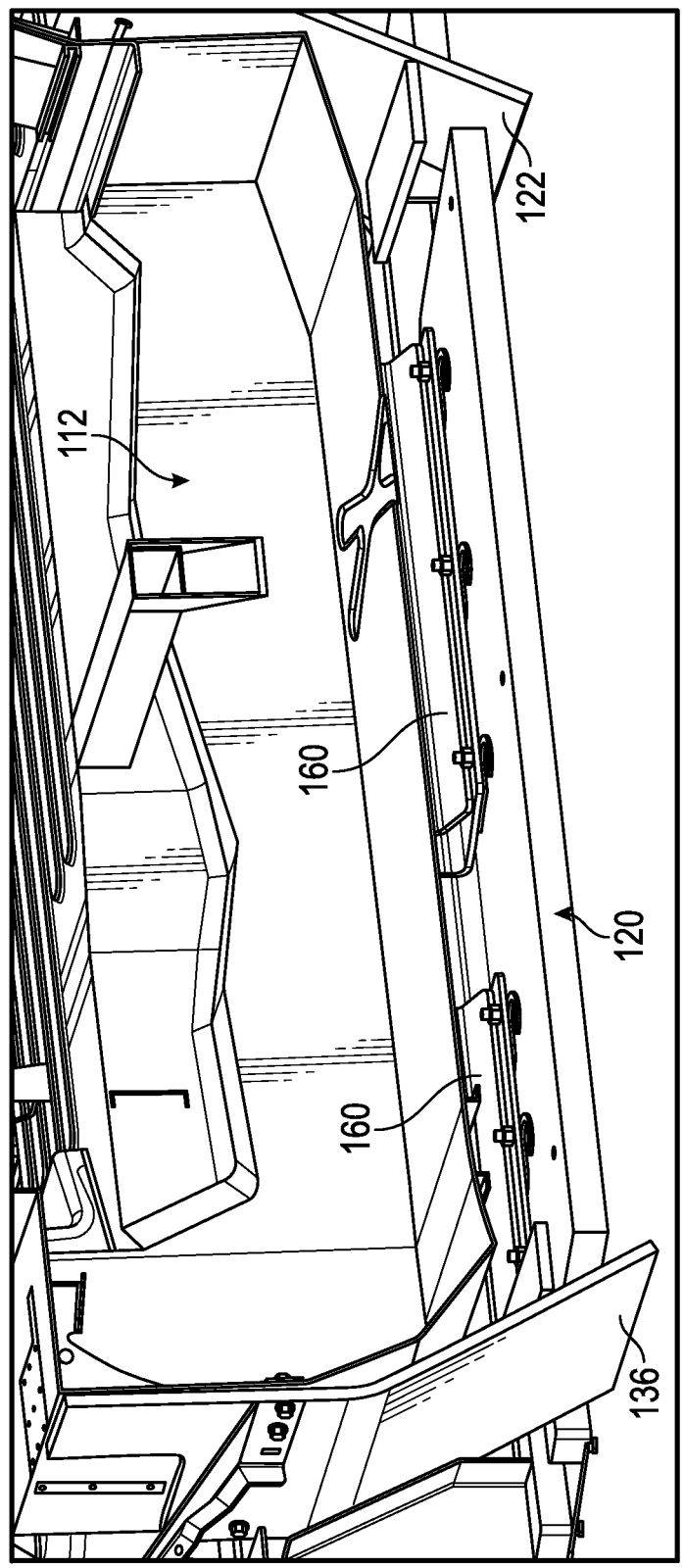
FIG. 24 is a partial cutaway perspective view of various armor components for the vehicle of FIG. 22, according to an exemplary embodiment.

As shown in FIGS. 22-23, vehicle 110 includes a side armor panel, shown as sidewall armor 144. Such sidewall armor 144 is configured to overlap the gap (e.g., blast gap, clearance, spacing, unarmored portion, etc.) between the cab 112 and the underbody armor component 120. Without such an overlap, debris or a blast wave may injure the occupants of vehicle 110 by traveling through the gap and impacting the cab 112. As shown FIG. 24, rear wheel well armor component 122 and front wheel well armor component 136 is configured to overlap the gap between the cab 112 and the underbody armor component 120. Thus, the sidewall armor 144, rear wheel well armor component 122, and front wheel well armor component 136 provide overlap blast protection for the vehicle 110.

As shown in FIGS. 22-25, the sidewall armor 144, rear wheel well armor component 122, and front wheel well armor component 136 are coupled to the cab 112 (e.g., with fasteners). During a blast event, the shock wave and shear force may cause failure of bolts or other fasteners. Such failure may be reduced with crush sections formed at the interface between the underbody armor component 120 and the sidewall armor 144, among other suitable locations. According to an exemplary embodiment, the interface between the underbody armor component 120 and the sidewall armor 144 includes projections, shown as shear fingers 121 that extend into corresponding openings, shown as apertures 146 formed in the sidewall armor 144. According to an exemplary embodiment, the sidewall armor 144 includes a bottom member 148 that forms a bottom portion of each of the apertures 146 that support shear fingers 121 after a blast event.

According to an exemplary embodiment, apertures 146 include an energy absorption device, shown crushable member 150. Such a crushable member 150 may deform (e.g., distort, crush, bend, crumple, etc.) during a blast event where the underbody armor component 120 is subjected to blast forces. By way of example, during a blast event, the underbody armor component 120 may deform or flex causing the shear fingers 121 to contact the crushable members 150. Instead of transferring blast energy directly to the sidewall armor 144 and to the door of the cab 112, the crushable members 150 may plastically deform to help dissipate a portion of the blast energy. Thereafter, the shear fingers 121 extending from underbody armor component 120 and into corresponding slots may prevent the joint between the sidewall armor 144 and the underbody armor component 120 from failing thereby maintaining the integrity of the joint between the sidewall armor 144 and the door frame 113.

Crushable sections provide a benefit in a blast event as they require energy to plastically deform. Such crushable sections may absorb blast energy and increase the time before the interfacing member (e.g., armor panel, shear finger, projection, etc.) transfers energy to other portions of the vehicle. Further, the overlapping plates (e.g., sidewall armor and wheel well armor) prevent direct line-of-sight access to the cab floor itself. Overlapping plates may be used both on the sides and along the front and rear wheel wells of the vehicle, among other locations. Such a vehicle may include underbody armor that is isolated from the cab. A gap of a specific size (e.g., 0.5 inches, 1.0 inches, 1.5 inches, etc.) may be maintained at all locations to prevent contact between chassis and cab mounted components while driving.

During a blast event, a shock wave often causes fasteners and other retaining systems to fail. The addition of shear fingers or teeth integrated into the vehicle design may prevent fasteners from failing, offers support if the bolts do fail, and prevents penetration into the vehicle by retaining the moving component. During a blast event, loading of the underbody is often transmitted into the vertical sidewall of a cab. Such transmission may move the cab upwards without impacting the occupant but may shear the fasteners within the sidewall or those that couple the sidewall to add-on armor kits. A blast event for a traditionally designed vehicle may therefore result in failure of the mounting method. The addition of a crushable section to the sidewall may be used to attenuate the impulse into the side armor and fasteners has been incorporated into the embodiments shown in the figures and described above. The feature can be incorporated into the sidewall itself local to each fastener, to the bottom of the sidewall, or to the top of the underbody panel, among other configurations. It should be noted that the exact shape or method of energy absorption may be modified, as readily recognized by one having ordinary skill in the art.

It should be noted that references to "front," "rear," "top," and "base" in this description are merely used to identify various elements as are oriented in the FIGS., with "front" and "rear" being relative to the environment in which the device is provided.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of the various features as shown in the various exemplary embodiments is illustrative only. Although only a few embodiments have been described in detail in this disclosure, those skilled in the art who review this disclosure will readily appreciate that many modifications are possible (by way of example, variations in sizes, dimensions, structures, shapes and proportions of the various elements, values of parameters, mounting arrangements, use of materials, colors, orientations, etc.) without materially departing from the novel teachings and advantages of the subject matter recited in the claims. By way of example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present embodiments.

The invention claimed is:

1. A blast-resistant vehicle, comprising:
   a structural frame member including a structural tunnel having a curved upper portion extending downward into a first side wall and a second side wall;

a first frame coupled to the structural frame member and configured to receive a first axle assembly and a first suspension assembly;

a second frame coupled to the structural frame member and configured to receive a second axle assembly and a second suspension assembly;

a cab assembly coupled to the structural frame member and having a front portion and a rear portion and including a floor panel, a front firewall, a rear body panel, a first side panel, and a second side panel, wherein the cab assembly is isolated from the structural frame member, the first frame, and the second frame; and a front isolated joint configured to support the cab assembly, wherein the front isolated joint includes a frame bracket coupled to the structural frame member, a cab bracket coupled to the cab assembly, and a resilient member.

2. The blast resistant vehicle of claim 1, wherein the front isolated joint couples the front portion of the cab assembly to a front portion of the structural frame member.

3. The blast resistant vehicle of claim 1, wherein the resilient member is disposed between a mounting surface of the frame bracket and a corresponding mounting surface of the cab bracket.

4. The blast resistant vehicle of claim 1, wherein the resilient member comprises a rubber isolation mount.

5. The blast resistant vehicle of claim 1, wherein the frame bracket is coupled to at least one of the first and second side walls.

6. The blast resistant vehicle of claim 1, further comprising an armor assembly including a wheel plate coupled to the structural frame member.

7. The blast resistant vehicle of claim 1, further comprising a rear isolated joint configured to support the cab assembly.

8. The blast resistant vehicle of claim 7, wherein the rear isolated joints couples the rear portion of the cab assembly to a rear portion of the structural frame member.

9. A blast-resistant vehicle, comprising:

a structural frame member;

a first frame coupled to the structural frame member and configured to receive a first axle assembly and a first suspension assembly;

a second frame coupled to the structural frame member and configured to receive a second axle assembly and a second suspension assembly;

a cab assembly coupled to the structural frame member and having a front portion and a rear portion and including a floor panel, a front firewall, a rear body panel, a first side panel, and a second side panel, wherein the cab assembly is isolated from the structural frame member, the first frame, and the second frame;

a front isolated joint configured to support the cab assembly; and an armor assembly including a wheel plate coupled to the structural frame member, wherein the wheel plate defines an aperture proximate the front isolated joint configured to provide access to the front isolated joint.

10. A blast-resistant vehicle, comprising:

a structural frame member;

a first frame coupled to the structural frame member and configured to receive a first axle assembly and a first suspension assembly;

a second frame coupled to the structural frame member and configured to receive a second axle assembly and a second suspension assembly;

a cab assembly coupled to the structural frame member and having a front portion and a rear portion and including a floor panel, a front firewall, a rear body panel, a first side panel, and a second side panel, wherein the cab assembly is isolated from the structural frame member, the first frame, and the second frame; and an armor assembly, wherein the armor assembly includes a plurality of panels having overlapping edges to protect the cab assembly from debris.

11. An military vehicle, comprising:

a blast resistant assembly including:

a front sub-frame assembly including a front suspension and a front axle, a rear sub-frame assembly including a rear suspension and a rear axle, a structural frame member coupled to the front sub-frame and the rear sub-frame, an armor assembly coupled to the frame member, and a prime mover coupled to at least one of the front sub-frame and the rear sub-frame; and an isolated cab assembly having an outer surface, wherein spacing between the outer surface of the isolated cab assembly and the blast absorbing assembly defines a blast gap, wherein the armor assembly comprises a plurality of panels having overlapping edges to protect the isolated cab assembly from debris, the plurality of panels including an under body panel extending from the structural frame member, a side armor panel coupled to the under body panel, and a door armor plate coupled to a side of the cab assembly.

12. The military vehicle of claim 11, wherein the blast gap surrounds the isolated cab assembly.

13. The military vehicle of claim 11, wherein the blast gap is at least 0.25 inches.

14. The military vehicle of claim 11, wherein the side armor panel extends upward past a bottom edge of the door armor plate to provide ballistic overlap protection.

* * * * *